US012565612B2

(12) United States Patent (10) Patent No.: US 12,565,612 B2
Kato et al. (45) Date of Patent: *Mar. 3, 2026

(54) COLOR CONVERSION PARTICLE

(71) Applicant: IDEMITSU KOSAN CO., LTD.,
Tokyo (JP)

(72) Inventors: Takuya Kato, Tokyo (JP); Toru Inatome, Tokyo (JP); Yuta Higashino, Tokyo (JP); Yusuke Oda, Tokyo (JP); Yoshinori Kimoto, Tokyo (JP)

(73) Assignee: IDEMITSU KOSAN CO., LTD.,
Tokyo (JP)

( * ) Notice: Subject to any disclaimer, the term of this patent is extended or adjusted under 35 U.S.C. 154(b) by 357 days.

This patent is subject to a terminal disclaimer.

(21) Appl. No.: 18/038,688

(22) PCT Filed: Nov. 24, 2021

(86) PCT No.: PCT/JP2021/042892

§ 371 (c)(1),
(2) Date: May 24, 2023

(87) PCT Pub. No.: WO2022/113967

PCT Pub. Date: Jun. 2, 2022

(65) Prior Publication Data

US 2024/0034926 A1 Feb. 1, 2024

(30) Foreign Application Priority Data

Nov. 25, 2020 (JP) ................................. 2020-195058

(51) Int. Cl.
*C09K 11/02* (2006.01)
*C09K 11/56* (2006.01)

(52) U.S. Cl.
CPC ............ *C09K 11/02* (2013.01); *C09K 11/567* (2013.01)

(58) Field of Classification Search
CPC ...... C09K 11/02; C09K 11/567; C09K 11/673
See application file for complete search history.

(56) References Cited

U.S. PATENT DOCUMENTS 10,796,901 B2 10/2020 Pickett et al.
2019/0225883 A1 7/2019 Min et al.
(Continued)

FOREIGN PATENT DOCUMENTS

CN 110511741 A 11/2019
JP 2020-500134 A 1/2020
(Continued)

OTHER PUBLICATIONS

Hanzawa et al., "Material Design of Green-Light-Emitting Semiconductors: Perovskite-Type Sulfide SrHfS 3," Journal of the American Chemical Society, vol. 141, No. 13, 2019, pp. 5343-5349.
(Continued)

*Primary Examiner* — Bijan Ahvazi
(74) *Attorney, Agent, or Firm* — Foley & Lardner LLP

(57) ABSTRACT

A color conversion particle includes a core; and a shell that contains the core and absorbs excitation light, and emits light at the core or at an interface between the core and the shell upon receiving the irradiated excitation light. The shell is composed of a chalcogenide perovskite, and the core and the shell have band alignment that induces a Stokes shift.

27 Claims, 12 Drawing Sheets

(56) References Cited

U.S. PATENT DOCUMENTS

| | | | |
|---|---|---|---|
| 2020/0295227 A1 | 9/2020 | Torimoto et al. | |
| 2021/0040385 A1 | 2/2021 | Kuwabata et al. | |
| 2024/0002720 A1* | 1/2024 | Kato | G02B 5/223 |

FOREIGN PATENT DOCUMENTS

| | | |
|---|---|---|
| JP | 2020-152904 A | 9/2020 |
| TW | 201720910 A | 6/2017 |
| WO | WO-2019/160093 A1 | 8/2019 |

OTHER PUBLICATIONS

Bera et al., "Perovskite Nanocrystal Heterostructures: Synthesis, Optical Properties, and Applications," ACS Energy Letters, vol. 5, 2020, pp. 2858-2872.

"Challenges and Opportunities in Designing Perovskite Nanocrystal Heterostructures," ACS Energy Letters, vol. 5, 2020, pp. 2253-2255.

International Searching Authority, "International Search Report," issued in connection with International Patent Application No. PCT/JP2021/042892, dated Feb. 15, 2022.

International Searching Authority, "Written Opinion," issued in connection with International Patent Application No. PCT/JP2021/042892, dated Feb. 15, 2022.

Buscaglia et al., "Synthesis of BaTiO3 Core-Shell Particles and Fabrication of Dielectric Ceramics with Local Graded Structure", Chem. Mater., vol. 18, No. 17, Jun. 15, 2006, pp. 4002-4010.

Office Action issued in corresponding Chinese Patent Application No. 202180079405.7 dated Jan. 2, 2024 (10 pages).

Niu et al., "Bandgap Control via Structural and Chemical Tuning of Transition Metal Perovskite Chalcogenides", Advanced Science News, Advanced Materials, 2017, 1604733, pp. 1-6.

Office Action issued in corresponding Taiwanese Patent Application No. 110143827 dated Apr. 7, 2025.

* cited by examiner

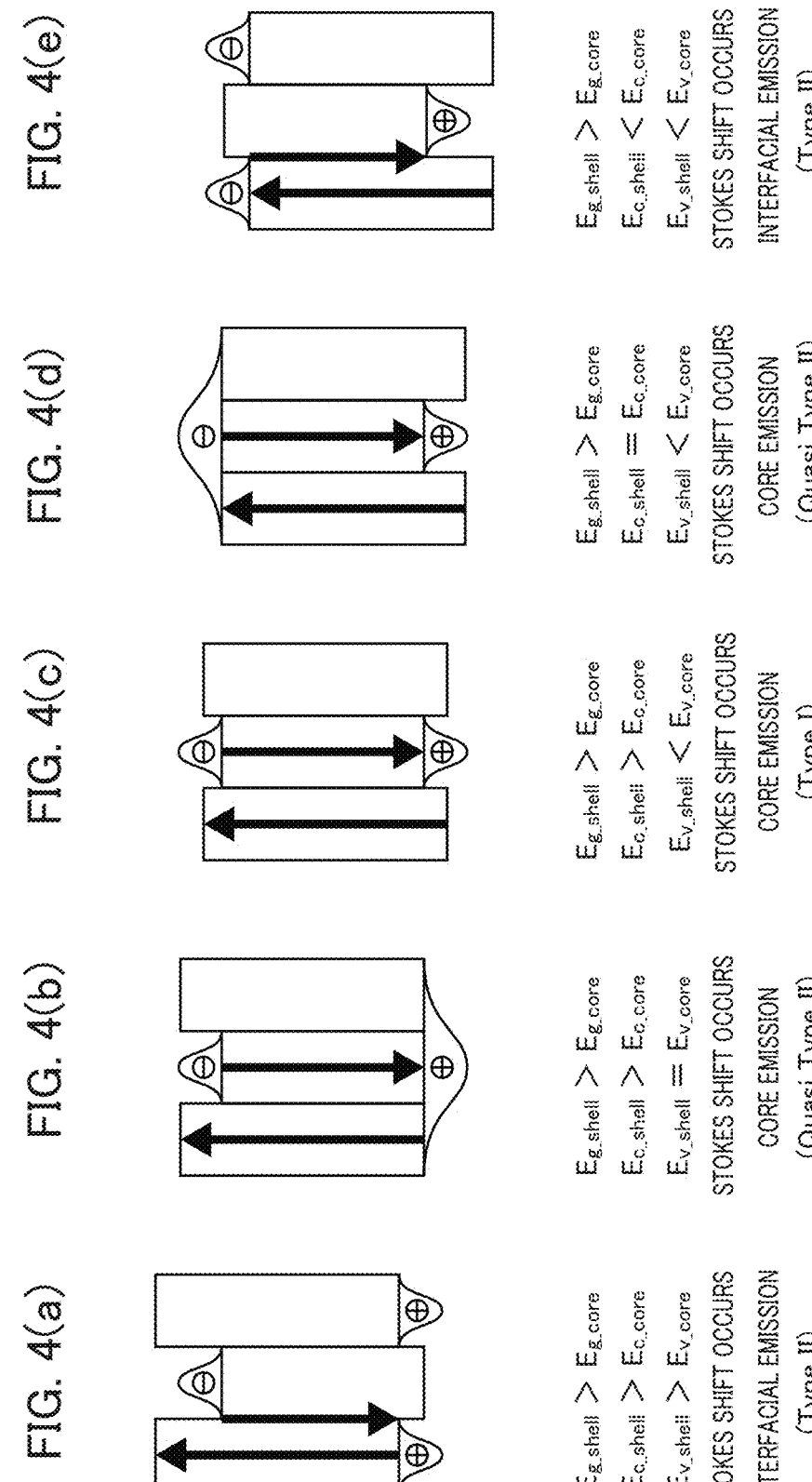

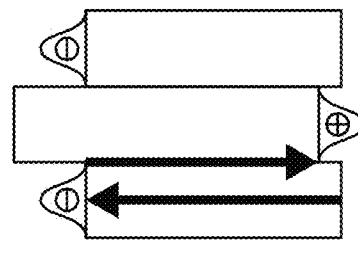
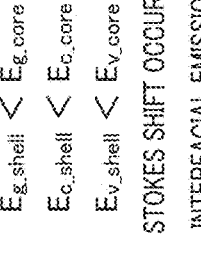
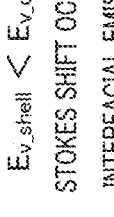
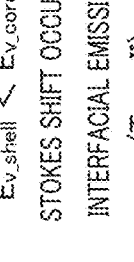
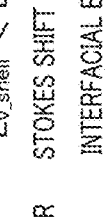
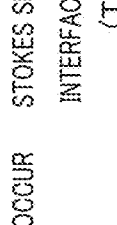
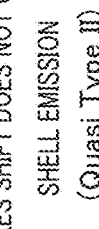
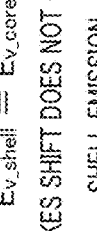
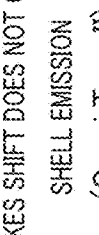
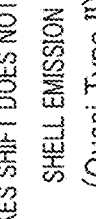
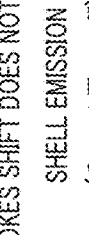
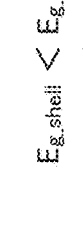
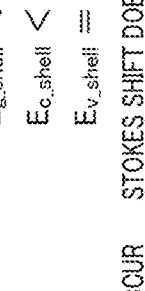
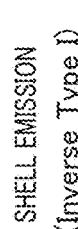
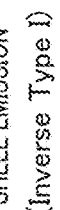
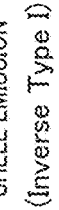
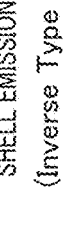
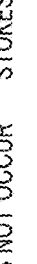
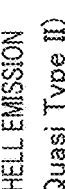
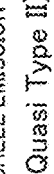
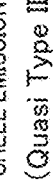
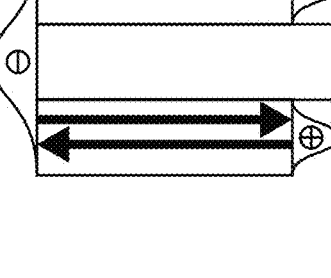
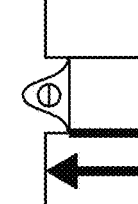
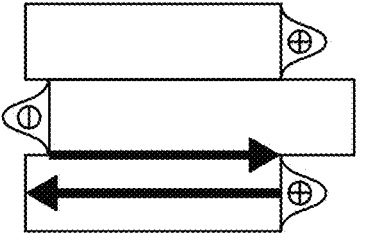

FIG. 5(e)

$E_{g\_shell} < E_{g\_core}$
$E_{c\_shell} < E_{c\_core}$
$E_{v\_shell} < E_{v\_core}$
STOKES SHIFT OCCURS
INTERFACIAL EMISSION
(Type II)

FIG. 5(d)

$E_{g\_shell} < E_{g\_core}$
$E_{c\_shell} < E_{c\_core}$
$E_{v\_shell} = E_{v\_core}$
STOKES SHIFT DOES NOT OCCUR
SHELL EMISSION
(Quasi Type II)

FIG. 5(c)

$E_{g\_shell} < E_{g\_core}$
$E_{c\_shell} < E_{c\_core}$
$E_{v\_shell} > E_{v\_core}$
STOKES SHIFT DOES NOT OCCUR
SHELL EMISSION
(Inverse Type I)

FIG. 5(b)

$E_{g\_shell} < E_{g\_core}$
$E_{c\_shell} = E_{c\_core}$
$E_{v\_shell} > E_{v\_core}$
STOKES SHIFT DOES NOT OCCUR
SHELL EMISSION
(Quasi Type II)

FIG. 5(a)

$E_{g\_shell} < E_{g\_core}$
$E_{c\_shell} > E_{c\_core}$
$E_{v\_shell} > E_{v\_core}$
STOKES SHIFT OCCURS
INTERFACIAL EMISSION
(Type II)

$E_{g\_shell} == E_{g\_core}$ $E_{c\_shell} > E_{c\_core}$ $E_{v\_shell} > E_{v\_core}$

STOKES SHIFT OCCURS

INTERFACIAL EMISSION (Type II)

$E_{g\_shell} == E_{g\_core}$ $E_{c\_shell} == E_{c\_core}$ $E_{v\_shell} == E_{v\_core}$

STOKES SHIFT DOES NOT OCCUR

CORE EMISSION (Flat)

$E_{g\_shell} == E_{g\_core}$ $E_{c\_shell} < E_{c\_core}$ $E_{v\_shell} < E_{v\_core}$

STOKES SHIFT OCCURS

INTERFACIAL EMISSION (Type II)

FIG. 7(a)
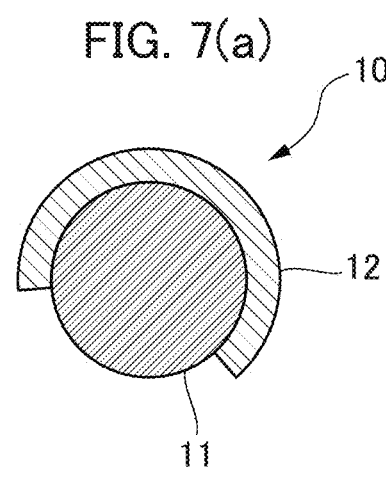
FIG. 7(b)
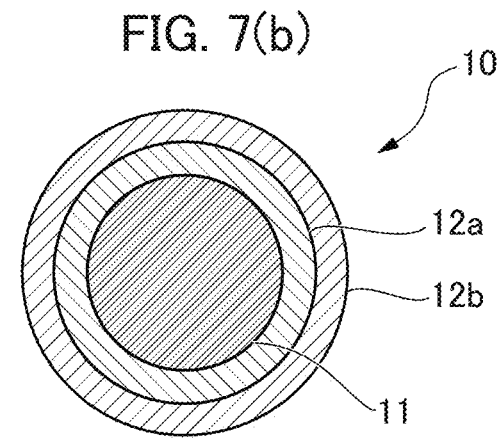
FIG. 7(c)
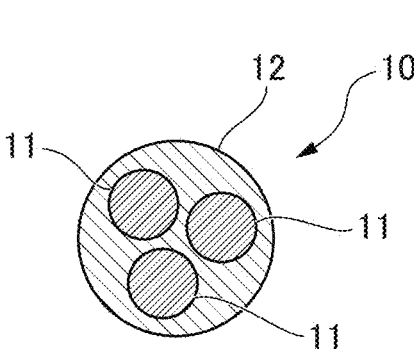
FIG. 7(d)
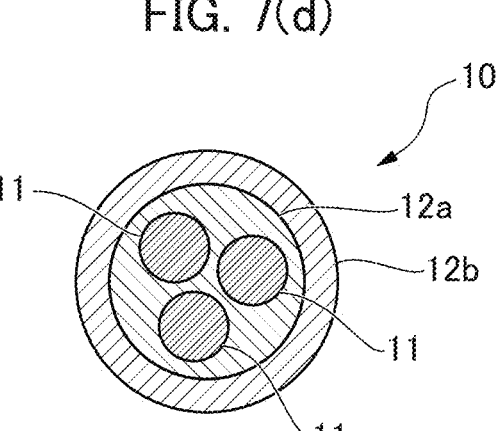
FIG. 7(e)
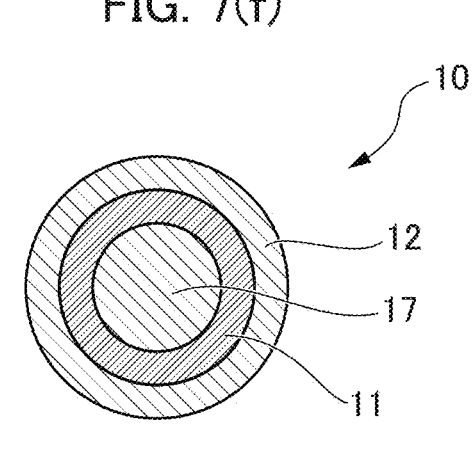
FIG. 7(f)

FIG. 8(a)
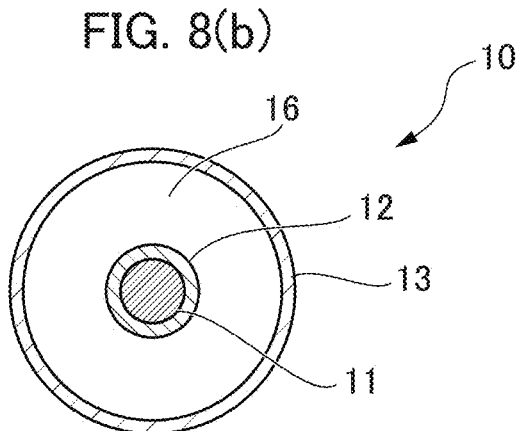
FIG. 8(b)
FIG. 8(c)
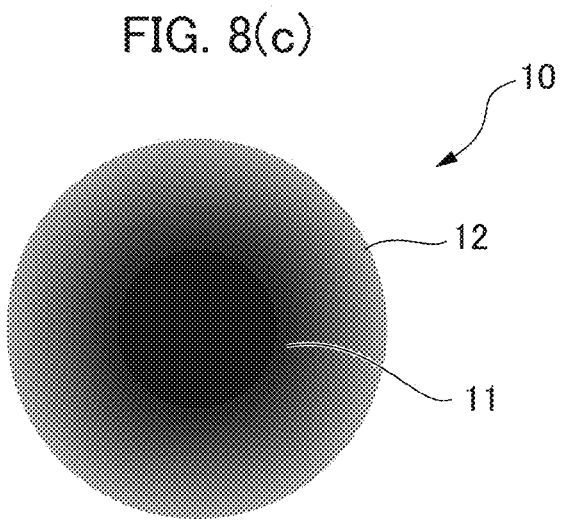

FIG. 12

| CORE | SHELL | Type | EXPRESSION OF STOKES SHIFT | CORRESPONDING DRAWING |
|---|---|---|---|---|
| $SrZrS_3$ | $SrZrS_3$ | Flat | No | FIG.6(b) |
|  | $BaZrS_3$ | Inverse Type I | No | FIG.5(c) |
|  | $SrHfS_3$ | Type II | Yes | FIG.4(a) |
|  | $BaHfS_3$ | Type II | Yes | FIG.5(a) |
| $BaZrS_3$ | $SrZrS_3$ | Type I | Yes | FIG.4(c) |
|  | $BaZrS_3$ | Flat | No | FIG.6(b) |
|  | $SrHfS_3$ | Type II | Yes | FIG.4(a) |
|  | $BaHfS_3$ | Type II | Yes | FIG.4(a) |
| $SrHfS_3$ | $SrZrS_3$ | Type II | Yes | FIG.5(e) |
|  | $BaZrS_3$ | Type II | Yes | FIG.5(e) |
|  | $SrHfS_3$ | Flat | No | FIG.6(b) |
|  | $BaHfS_3$ | Inverse Type I | No | FIG.5(c) |
| $BaHfS_3$ | $SrZrS_3$ | Type II | Yes | FIG.4(e) |
|  | $BaZrS_3$ | Type II | Yes | FIG.5(e) |
|  | $SrHfS_3$ | Type I | Yes | FIG.4(c) |
|  | $BaHfS_3$ | Flat | No | FIG.6(b) |

COLOR CONVERSION PARTICLE

CROSS-REFERENCE TO RELATED APPLICATIONS

The present application claims priority under 35 U.S.C. § 371 to International Patent Application No. PCT/JP2021/042892, filed Nov. 24, 2021, which claims priority to and the benefit of Japanese Patent Application No. 2020-195058, filed on Nov. 25, 2020. The contents of these applications are hereby incorporated by reference in their entireties.

TECHNICAL FIELD

The present invention relates to a color conversion particle.

BACKGROUND ART

Conventionally, in lighting, display devices, solar cells, and the like, color conversion using wavelength conversion (downconversion) of converting excitation light incident on an object from the outside into light having a longer wavelength and emitting the light has been widely utilized. In this type of color conversion, for example, a phosphor to which an activator is added may be used. However, conventional phosphors have limitations in controllability of an emission wavelength, an emission peak width, and the number of peaks (color purity), and for example, there are many problems to be improved in applications requiring high color purity at a specific wavelength such as a display device.

On the other hand, in recent years, core-shell quantum dots to which the quantum effect is applied have attracted attention as solutions to the above problems, and core-shell quantum dots are being applied in various fields. A core-shell quantum dot is a minute semiconductor particle having a diameter of several nanometers, and has a structure in which a core functioning as a light emission unit is covered from the outside by a shell functioning as a carrier confinement layer or a light absorption unit.

In this type of core-shell quantum dot, the substance of the core is selected from, for example, Cd(S, Se), InP, and $APbX_3$ (A=Cs, MA; X=Cl, Br, I). The substance of the shell is, for example, Zn(S, Se) or $A'_2PbX_4$ (A'=OA). Here, MA is methyl ammonium and OA is octyl ammonium. In addition, Non Patent Literature 1 and 2 disclose core-shell quantum dots using a halide perovskite represented by $CsPbBr_3$.

CITATION LIST

Non Patent Literature

Non Patent Literature 1: S. Bera et al., "Perovskite Nanocrystal Heterostructures: Synthesis, Optical Properties, and Applications," ACS Energy Lett. 5, 2858-2872 (2020).

Non Patent Literature 2: "Challenges and Opportunities in Designing Perovskite Nanocrystal Heterostructures," ACS Energy Lett. 5, 2253-2255 (2020).

SUMMARY OF INVENTION

Technical Problem

CdSe, which is one of the materials of the core-shell quantum dots, contains Cd restricted by RoHS and has toxicity. Therefore, InP has been developed as an alternative material to Cd(S, Se), but InP has problems in terms of material durability and light emission efficiency in addition to containing the rare metal In. On the other hand, a halide perovskite represented by CsPbBr has high absorbance and light emission efficiency, but the material durability is not sufficient.

In addition, since the quantum dot has a small size of several nanometers, the absorbance is small. On the other hand, when the size of the quantum dot is increased in order to increase the absorbance, there is a concern about the quantum size effect being lost, or the light emission efficiency being lowered due to an increase in loss due to reabsorption of light emission.

The present invention has been made in view of the above circumstances, and provides a color conversion particle that ensures durability and achieves high absorbance and high light emission efficiency.

Solution to Problem

According to an aspect of the present invention, there is provided a color conversion particle including: a core; and a shell that contains the core and absorbs excitation light, and emits light at the core or at the interface between the core and the shell upon receiving the irradiated excitation light. The shell is composed of a chalcogenide perovskite, and the core and the shell have band alignment that induces a Stokes shift.

Advantageous Effects of Invention

According to the color conversion particle of the present invention, durability can be ensured, and high absorbance and high light emission efficiency can be realized.

BRIEF DESCRIPTION OF DRAWINGS

FIGS. 4(a)-4(e) is a diagram showing an example of band alignment of a core and a shell.

FIGS. 5(a)-5(e) is a diagram showing an example of band alignment of the core and the shell.

FIGS. 7(a)-7(f) is a diagram showing a modification example of the color conversion particle of the present embodiment.

FIGS. 8(a)-8(c) is a diagram showing a modification example of the color conversion particle of the present embodiment.

FIG. 12 is a diagram showing a correspondence between a combination of materials of a core and a shell, and a type of band alignment and expression of a Stokes shift in the example and comparative example.

DESCRIPTION OF EMBODIMENTS

Figure 1A:
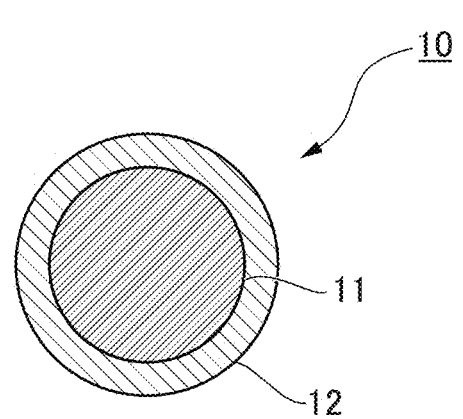
FIGS. 1(a) and 1(b) are a schematic diagram showing a configuration example of a color conversion particle of the present embodiment.

Hereinafter, embodiments will be described with reference to the drawings as appropriate.

In the embodiment, for ease of description, structures or elements other than the main parts of the present invention will be described in a simplified manner or omitted. In the drawings, the same elements are denoted by the same reference numerals. In the drawings, shapes, dimensions, and the like of each element are schematically shown, and do not indicate actual shapes, dimensions, and the like.
<Structure of Color Conversion Particle>

FIG. 1($a$) is a schematic diagram showing a configuration example of a color conversion particle of the present embodiment.

A color conversion particle 10 has a particle shape with a nanometer scale as a whole, and absorbs incident excitation light and reemits (emits) light with different energy (wavelength) to perform color conversion.

The color conversion particle 10 includes a core 11 as a light emission unit and a shell 12 as a light absorption unit. The shell 12 contains one or more cores 11 therein. Then, a part or the whole of each core 11 is covered with the shell 12 from the outside to form the color conversion particle 10.

In the color conversion particle 10, the core 11 and the shell 12 are provided separately, and a chalcogenide perovskite that will be described later is adopted as a material of the shell 12. As a result, high absorbance of the shell 12 with respect to excitation light is realized, and durability of the color conversion particle 10 is improved. This point will be described later.

In addition, in the core 11 and the shell 12, the band alignment of energy $E_c$ at the lower end of the conduction band and energy $E_v$ at the upper end of the valence band induces a Stokes shift. Band alignment of the core 11 and the shell 12 will be described later.

Furthermore, by adjusting the band gap between the core 11 and the shell 12, it is possible to impart a characteristic of transmitting light emitted from the core 11 to the shell 12. As a result, in the color conversion particle 10, the light generated in the core 11 can be suppressed from being reabsorbed by the shell 12.
<Shell 12>
(Material of Shell)

The shell 12 is composed of a chalcogenide perovskite, which is a semiconductor material that absorbs a target excitation light wavelength and generates excitation carriers.

The chalcogenide perovskite is a semiconductor composed of a perovskite crystal structure group containing chalcogen elements (S, Se, and Te) at the X site, and includes a semiconductor in which a part of the X site is substituted with oxygen (O).

The perovskite described above represents a substance group having a cubic crystal structure having a $BX_6$ octahedron as a skeleton, which is represented by the chemical formula $ABX_3$, and can take a tetragonal or orthorhombic crystal structure due to lattice distortion. In addition, a plurality of stable crystal structures are shown computationally in a similar $ABX_3$ composition. These crystal structures include structures close to perovskites as well as significantly different structures. Further, as the derivative structure, there are a Ruddlesden-Popper type or Dion-Jacobson type layered perovskite based on a perovskite structure, a double perovskite crystal structure in which different elements are alternately arranged at the B site, and the like.

In the present specification, the above-described crystal structure is collectively referred to as a "perovskite crystal structure group."

The perovskite crystal structure group specifically includes a substance having the following crystal structure.

Cubic perovskite, tetragonal perovskite, $GdFeO_3$ type orthorhombic, $YScS_3$ type orthorhombic, $NH_4CdCl_3$ type orthorhombic, $BaNiO_3$ type hexagonal, $FePS_3$ type monoclinic, $PbPS_3$ type monoclinic, $CeTmS_3$ type monoclinic, Ruddlesden-Popper type layered perovskite, Dion-Jacobson type layered perovskite, and double perovskite In the perovskite crystal structure group, the crystal structure and the electronic structure change depending on the composition and synthesis conditions, and the photoelectronic properties and the chemical characteristics change. Therefore, the composition and conditions are selected to obtain a crystal structure suitable for the purpose.

For example, a substance having a cubic perovskite, a tetragonal perovskite, a $GdFeO_3$ type orthorhombic perovskite, a Ruddlesden-Popper type layered perovskite, or a double perovskite structure has excellent photoelectronic properties and chemical characteristics. In addition, the Dion-Jacobson type layered perovskite structure can further improve chemical stability.

In particular, a substance having a crystal structure of a $GdFeO_3$ type orthorhombic perovskite represented by $ABX_3$ (A=Group 2, B=Group 4) is known to have excellent photoelectronic properties including a high light absorption coefficient.

In addition, the chemical formula of the chalcogenide perovskite can be represented by $ABX_3$, $A'_2A_{n-1}B_nX_{3n+i}$, $A''A'''B''_2X_7$, $A''A_2B''_3X_{10}$, and $A_2BB'X_6$.

In the above chemical formulae, X represents chalcogen elements (S, Se, and Te). A and A' represent Group 2 elements (Ca, Sr, and Ba), A'' represents Group 1 elements (Li, Na, K, Rb, and Cs), and A''' represents Group 3 elements (rare earth elements) and Bi. B and B' represent Group 4 elements (Ti, Zr, and Hf), and B'' represents Group elements (V, Nb, and Ta). In addition, n is a positive integer. Further, A and A' may be the same element, as may B and B'. In addition, A, A', A'', A''', B, B', B'', and X include those obtained by mixing elements of the respective groups at any ratio.

Examples of the chalcogenide perovskite represented by the chemical formula $ABX_3$ include the following substances. In the following example, X is selected from (S, Se) which are superior materials among chalcogen elements, A is selected from (Sr, Ba) which are superior materials among Group 2 elements, and B is selected from (Zr, Hf) which are superior materials among Group 4 elements.

$SrZrS_3$, $SrZrSe_3$, $SrHfS_3$, $SrHfSe_3$, $BaZrS_3$, $BaZrSe_3$, $BaHfS_3$, and $BaHfSe_3$ In addition examples of the chalcogenide perovskite represented by the chemical formula $A'_2A_{n-1}B_nX_{3n+1}$ include the following substances. X is selected from (S, Se) which are superior materials among chalcogen elements, A and A' are selected from (Sr, Ba) which are superior materials among Group 2 elements, and B is selected from (Zr, Hf) which are superior materials among Group 4 elements.

$Sr_2Ba_{n-1}Zr_nS_{3n+1}$, $Sr_2Ba_{n-1}Zr_nSe_{3n+1}$, $Sr_{n+1}Zr_nS_{3n+1}$, $Sr_{n+1}Zr_nSe_{3n+1}$, $Ba_2Sr_{n-1}Zr_nS_{3n+1}$, $Ba_2Sr_{n-1}Zr_nSe_{3n+1}$, $Ba_{n+1}Zr_nS_{3n+1}$, $Ba_{n-1}Zr_nSe_{3n+1}$, $Sr_2Ba_{n-1}Hf_nS_{3n+1}$, $Sr_2Ba_{n-1}Hf_nSe_{3n+1}$, $Sr_{n+1}Hf_nS_{3n+1}$, $Sr_{n+1}Hf_nSe_{3n+1}$, $Ba_2Sr_{n-1}Hf_nS_{3n+1}$, $Ba_2Sr_{n-1}Hf_nSe_{3n+1}$, $Ba_{n+1}Hf_nS_{3n+1}$, and $Ba_{n+1}Hf_nSe_{3n+1}$ The chalcogenide perovskite can also be expressed as $(Sr_xBa_{1-x})$ $(Zr_yHf_{1-y})$ $(S_zSe_{1-z})_3$ or $(Sr_xBa_{1-x})_2(Sr_xBa_{1-x})_{n-1}(Zr_yHf_{1-y})_n(S_zSe_{1-z})_{3n+1}$ (where each of x, x', y, and z is a value from 0 to 1).

Note that the superior materials in X, A, A', and B described above are materials having a band gap suitable for applications that emit visible light, such as a light emitting device, a display device, and a lighting device, when applied to the color conversion particle 10.

In the chalcogenide perovskite, a carrier concentration or a crystal structure can be controlled or other physical and chemical properties can be adjusted by partial substitution of a constituent element with an element of the same or a different group. For example, the Group 1 elements can be substituted with elements of Groups 1 and 2, the Group 2 elements can be substituted with elements of Groups 1, 2, and 3, the Group 3 elements can be substituted with elements of Groups 2, 3, and 4, the Group 4 elements can be substituted with elements of Groups 3, 4, and 5, and the Group 16 elements can be substituted with elements of Groups 15, 16, and 17.

The chalcogenide perovskite has the following features.

The chalcogenide perovskite has a large light absorption coefficient and excellent light emission performance (light emission efficiency and half-value width). In addition, the profile of the light absorption coefficient of the chalcogenide perovskite sharply rises at the band end. Therefore, the chalcogenide perovskite has a characteristic that the absorbance in the vicinity of the band gap end is high.

Therefore, the chalcogenide perovskite shell 12 has high absorbance and can efficiently absorb excitation light.

In addition, the chalcogenide perovskite has high chemical stability, and is excellent in durability against external environments and stimuli such as the atmosphere, moisture, heat, and light. Therefore, the chalcogenide perovskite shell 12 has high durability, and can suppress deterioration of the shell 12 itself and the core 11 therein.

Furthermore, the chalcogenide perovskite has high safety because toxic elements are not contained, and is also advantageous in that raw material cost is low because rare metals are not contained.

(Band Gap of Shell)

Next, the band gap of the shell 12 using the chalcogenide perovskite will be described.

In the color conversion particle, light emitted at the core or core-shell interface passes through the shell and is extracted to the outside. Therefore, the shell needs to transmit emitted light. When absorption of light emitted in the shell occurs, the light emission efficiency in the color conversion particle is reduced by that amount. Therefore, the band gap of the shell is preferably equal to or greater than the energy of emitted light.

When the band gap is 3.4 eV or less, the shell 12 using chalcogenide perovskite can effectively absorb ultraviolet excitation light (wavelength of 365 nm) from a GaN (Eg to 3.4 eV) LED. In addition, when the band gap is 2.7 eV or less, the shell 12 using the chalcogenide perovskite can effectively absorb blue excitation light (wavelength of 460 nm) from an InGaN LED or OLED.

Therefore, the band gap of the shell 12 is preferably 3.4 eV or less in order to absorb light having a wavelength of 365 nm or more. Alternatively, the band gap of the shell 12 is preferably 2.7 eV or less in order to absorb light having a wavelength of 460 nm or more.

Here, ZnS (Eg to 3.6 eV; a wavelength of 340 nm) commonly used for the shell in conventional quantum dots cannot absorb the excitation light. Therefore, in the case of the shell using ZnS, the Stokes shift is not induced by the excitation light. Similarly, since the band gap of ZnSe is 2.7 eV (wavelength of 460 nm), absorption of ultraviolet excitation light is possible, but absorption of blue excitation light is weak.

In any case, it can be seen that since the conventional material has a low light absorption coefficient in the vicinity of the band gap end, it cannot sufficiently absorb the excitation light, and the absorbance of the shell is lower than that of the chalcogenide perovskite.

(Thickness of Shell)

The lower limit and the upper limit of the thickness of the shell 12 are defined from the following viewpoints.

First, the shell 12 as the light absorption unit is required to have a thickness capable of sufficiently absorbing the excitation light.

Figure 2:
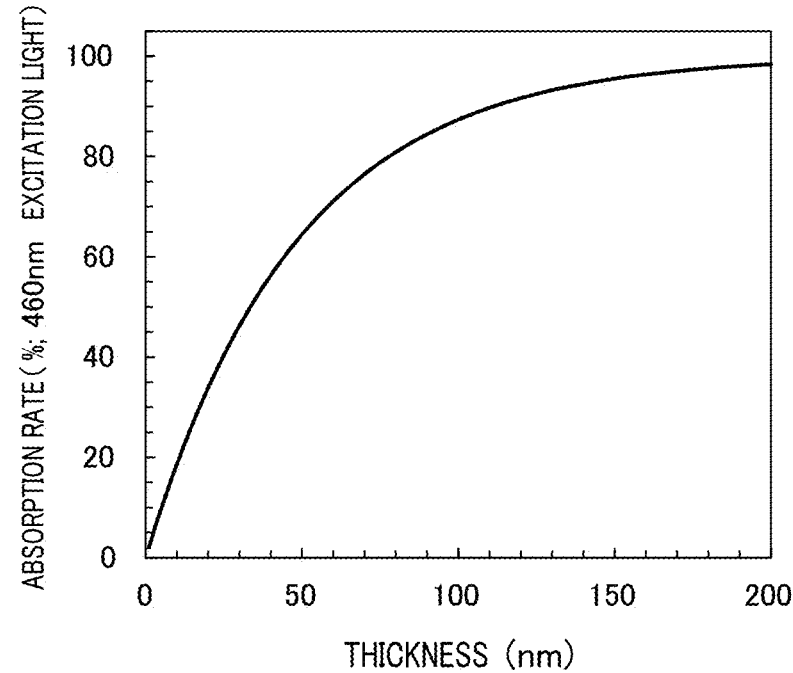
FIG. 2 is a graph showing an example of a relationship between a thickness of a shell and an absorption rate of excitation light.

FIG. 2 is a graph in which an absorption rate of 460 nm excitation light (blue light) with respect to a thickness of the shell 12 is calculated using a light absorption coefficient of $SrZrS_3$ which is a representative chalcogenide perovskite material. The vertical axis of FIG. 2 represents the absorption rate of 460 nm excitation light, and the horizontal axis of FIG. 2 represents the thickness (nm) of the shell 12.

The absorption rate of blue light shown in FIG. 2 was approximately 4% at 2 nm, approximately 10% at 5 nm, approximately 20% at 10 nm, approximately 46% at 30 nm, approximately 64% at 50 nm, and approximately 87% at 100 nm.

As an application of the color conversion particle 10, it is usually assumed that a large number of color conversion particles 10 are contained in a film, a coating film, a resin, or the like and used as a color conversion material. In this case, with reference to FIG. 2, when the individual shells 12 have a thickness of at least 2 nm, sufficient absorbance can be realized in the entire color conversion material to which a large number of color conversion particles are applied.

Specifically, in the case of application to a color conversion film, it is assumed that 100 or more color conversion particles 10 are present in the thickness direction of the color conversion film. When the thickness of the shell 12 is 2 nm, approximately 4% of blue light can be absorbed by one color conversion particle 10, and thus the color conversion film can sufficiently absorb blue light.

Second, when the thickness of the shell 12 is extremely thick, the photoexcited carriers recombine and are deactivated before reaching the core 11, and the light emission efficiency is reduced.

Here, when the diffusion length of the carrier is estimated from the electrical conductivity of $SrHfS_3$, which is a representative chalcogenide perovskite material, the diffusion length is approximately 30 nm at the longest. In addition, as shown in FIG. 2, approximately 98% of blue light is absorbed at a thickness of 200 nm. Assuming that carriers excited by light absorbed at a depth of 200 nm of the shell 12 are diffused at a diffusion length of 30 nm, almost no carriers can be reached when the carrier is separated in the depth direction from the position at a depth of 200 nm of the shell 12 by more than 100 nm. Therefore, when the shell 12 is thicker than 300 nm, photoexcited carriers cannot reach the core 11, and the light emission efficiency decreases. Therefore, the thickness of the shell 12 is in a range of 2 nm or more and 300 nm or less.

From the viewpoint of suppressing recombination of photoexcited carriers, as long as the shell 12 can sufficiently absorb excitation light, the thickness of the shell 12 is preferably thinner, and for example, the thickness of the shell 12 is preferably 2 nm or more and 50 nm or less. When the thickness of the shell 12 is 50 nm, approximately 64% of blue light is absorbed. In a case where light absorption is increased within a range not sacrificing the distance over which carriers diffuse, the thickness of the shell 12 is preferably up to 50 nm.

When the thickness of the shell 12 is 30 nm, the absorption of blue light is reduced to approximately 46%, but since the thickness of the shell is within the range of the diffusion length of the carrier, more carriers can move to the core, and the light emission efficiency can be increased. In addition, when the thickness of the shell 12 is 10 nm, blue light is absorbed by only approximately 20%, but since the shell is sufficiently thinner than the diffusion length of the carrier, most of the carrier moves to the core, and the light emission efficiency can be further increased. Therefore, when the thickness of the shell 12 is preferably in the range of 2 nm or more and 30 nm or less (blue light absorption rate: approximately 4% to approximately 46%), more preferably in the range of 2 nm or more and 10 nm or less (blue light absorption rate: approximately 4% to approximately 20%), both sufficient absorption of blue light and good carrier movement to the core 11 can be achieved.

<Core 11>

The core 11 is a light emitting particle made of a semiconductor material that generates fluorescence of a target emission wavelength by excitation light. The core 11 as a light emitting particle causes electron-level transition having energy corresponding to a target emission wavelength.

When a semiconductor is used for light emitting particles, basically, fluorescence, which is generated when interband recombination between electrons excited in a conduction band and holes in a valence band occurs, is used for light emission. Therefore, the emission wavelength in the light emitting particle corresponds to the band gap energy $E_{g,bulk}$ of the bulk.

When the particle size of the light emitting particles is reduced and the quantum size effect due to electron confinement is remarkably exhibited, the energy level of the electron becomes discrete. In this case, the energy (band gap) $E_{ex}$ in the lowest excited state is greater than $E_{g,bulk}$ and depends on the particle size. That is, when the particle size of the light emitting particles decreases, the emission wavelength shifts to a shorter wavelength side than the bulk state, and the emission wavelength changes depending on the particle size. By utilizing this property, the emission wavelength of the light emitting particles can be controlled.

Specifically, $E_{ex}$ of the light emitting particle having a radius r is given by the following formula. Note that p represents an exciton equivalent mass, $E_{b,ex}$ represents exciton binding energy, and $r_B$ represents an exciton Bohr radius.

[Math. 1]

$$E_{ex} = E_{g,bulk} + \frac{\hbar^2}{2\mu}\left(\frac{\pi}{r}\right)^2 - E_{b,ex}\left[3.575\left(\frac{r_B}{r}\right) + 0.248\right]$$

μ, $E_{b,ex}$, and $r_B$ are each given by the following formula with ε as the dielectric constant of the light emitting particle. Note that m*e is an effective mass of electrons, and m*$_h$ is an effective mass of holes.

[Math. 2]

$$\mu = \frac{m_e^* m_h^*}{m_e^* + m_h^*}$$

$$E_{b,ex} = \frac{\hbar^2}{2\mu r_B^2}$$

$$r_B = \frac{4\pi\varepsilon\hbar^2}{\mu e^2}$$

Figure 3:
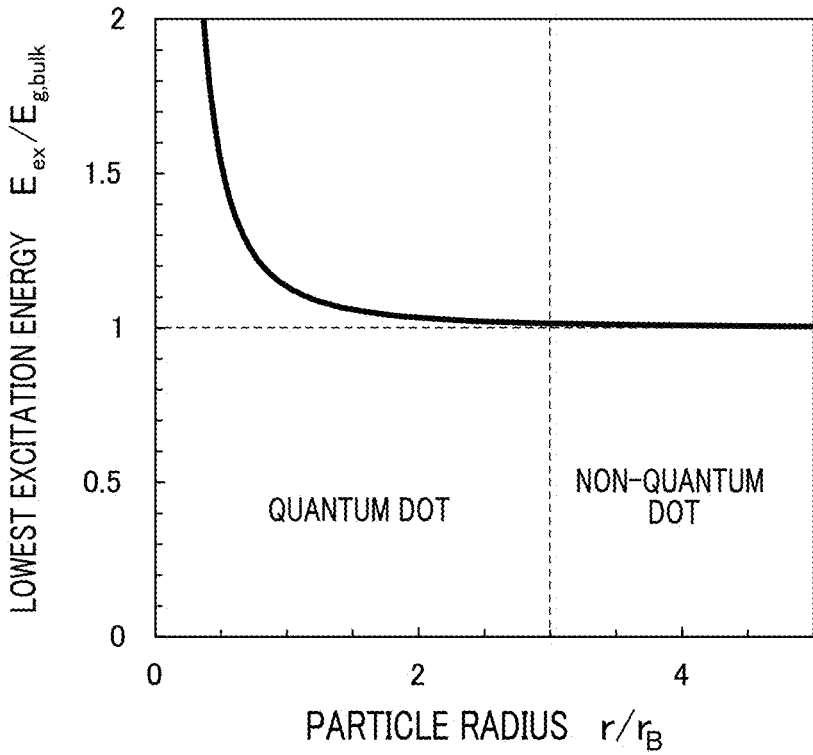
FIG. 3 is a graph showing an example of a relationship between excitation energy and a particle radius.

FIG. 3 is a graph showing dependency of $E_{ex}$ on r when μ=0.1 and ε=10. The vertical axis of FIG. 3 represents $E_{ex}/E_{g,bulk}$, and the horizontal axis of FIG. 3 represents $r/r_B$. As the radius r of the light emitting particle decreases and approaches $r_B$, the value of $E_{ex}$ gradually increases from $E_{g,bulk}$. When r is equal to or less than $r_B$, the value of $E_{ex}$ remarkably increases (quantum size effect).

A light emitting particle having a particle size in a range in which the emission wavelength depends on the particle size based on $r_B$ defined by the above formula by utilizing the characteristics of the quantum size effect is referred to as a "quantum dot." On the other hand, a light emitting particle having a particle size in a range in which the emission wavelength does not substantially depend on the particle size is referred to as a "non-quantum dot."

Note that the particle size at which the quantum size effect is exhibited varies depending on the parameters of μ and ε, but when μ=0.1 and ε=10 are assumed as typical semiconductors, approximately $r=3r_B$ is a boundary of the particle size (radius) at which the quantum size effect is exhibited. In FIG. 3, the boundary is indicated by a broken line.

As described above, the particle size at which the quantum size effect is exhibited in the light emitting particles is basically characterized in relation to the exciton Bohr radius $r_B$, but the dielectric constant of the substance and the effective mass of electron holes are also involved in the expression of the quantum size effect, and the change in the value of $E_{ex}$ is also continuous. Therefore, it is actually difficult to uniquely express the boundary between quantum dot and the non-quantum dot by the particle size and other physical property values.

Here, the particle radius dependency of the lowest excitation energy $E_{ex}$ calculated using typical physical property values (m$_e$*=0.3 m$_0$, m$_h$*=0.5 m$_0$, ε=6ε$_0$, $E_{g,bulk}$=1.93 eV) of BaZrS$_3$ as a representative chalcogenide perovskite material is considered. Note that m$_0$ is the mass of electrons.

In the example of BaZrS$_3$, the effective particle radius of a typical quantum size is considered to be approximately 7.5 nm. Therefore, in the example of BaZrS$_3$, particles having a particle size of 15 nm or less are considered as quantum dots, and particles having a particle size of more than 15 nm are considered as non-quantum dots.

The core 11 of the present embodiment may be either the quantum dot or the non-quantum dot.

When the core 11 is a quantum dot, there is an advantage that the emission wavelength (color) can be controlled by changing the particle size of the same substance. In the case of the quantum dot, the light emission efficiency of the core 11 is high, and the peak is narrow.

However, in order to align emission wavelengths (colors), strict particle size control is required, and an advanced producing technique is required for producing quantum dots. In addition, the quantum dots have poor chemical stability because of the fine particles thereof, and are easily aggregated, regrown, or decomposed, and thus require surface protection. In addition, since the quantum dots have discrete electronic states, the state density is small in both the valence band and the conduction band, and the light absorption coefficient is smaller than that of the bulk.

On the other hand, when the core 11 is a non-quantum dot, that is, when bulk light emission is used without expressing a quantum size effect using relatively large particles, problems of stability and light absorption are reduced. However, in the non-quantum dot, since the emission wavelength of the core 11 is determined by $E_{g,bulk}$, it is necessary to change $E_{g,bulk}$ by changing the composition and the crystal structure in order to adjust the emission wavelength.

As described above, since both the quantum dot and the non-quantum dot have advantages and disadvantages, as the configuration of the core 11, an appropriate configuration may be selected from the quantum dot and the non-quantum dot according to the situation and application. In addition, since the dimension in which the quantum size effect occurs varies depending on the material, the particle size of the core 11 is appropriately set according to the physical properties of the material, and the like.

On the other hand, in order to suppress the reabsorption by the core 11, the particle size of the core 11 is preferably small. For example, when the particle size of $BaZrS_3$ is 200 nm, 10% of red light having a wavelength of 630 nm generated in the core of another $BaZrS_3$ disposed in the vicinity is absorbed. Therefore, the particle size of the core 11 is preferably 200 nm or less.

When the particle size of the core 11 is 50 nm or less under the above conditions, the reabsorption of red light having a wavelength of 630 nm is 3%, and when the particle size of the core 11 is 25 nm or less, the reabsorption of red light having a wavelength of 630 nm can be suppressed to 2% or less. Therefore, the particle size of the core 11 is preferably 50 nm or less, and more preferably 25 nm or less.

The size of the particle size at which the core 11 can be stably present is preferably 1 nm or more.

From the above, the particle size of the core 11 is preferably 1 nm or more and 200 nm or less.

(Material of Core 11)

As a material of the core 11, for example, a substance (so-called activated phosphor) obtained by adding an activator to a base crystal such as an oxide or a nitride to serve as a light emission center (light emitting ion), a group II-VI semiconductor, a group III-V semiconductor, a group I-III-VI semiconductor, a group I-II-IV-VI semiconductor, a group IV-VI semiconductor, a halide perovskite semiconductor, an oxide perovskite, an organic-inorganic perovskite, Si, a carbon material, or a mixed crystal compound thereof can be used.

In addition, chalcogenide perovskite can also be used as a material of the core 11.

The core 11 using the chalcogenide perovskite having an excellent light absorption coefficient can be expected to have high light emission performance. In addition, in the core 11 using the chalcogenide perovskite, defects at the interface between the core 11 and the shell 12 are reduced and non-emissive recombination is reduced from the viewpoint of affinity with constituent elements of the shell and matching between the crystal structure and the lattice constant, and thus higher light emission efficiency can be expected.

As an example, when the chalcogenide perovskite is applied to the material of the core 11, a material different from the material of the shell 12 can be selected from the following substances.

$SrZrS_3$, $SrZrSe_3$, $SrHfS_3$, $SrHfSe_3$, $BaZrS_3$, $BaZrSe_3$, $BaHfS_3$, $BaHfSe_3$, $Sr_2Ba_{n-1}Zr_nS_{3n+1}$, $Sr_2Ba_{n-1}Zr_nSe_{3n+1}$, $Sr_{n+1}Zr_nS_{3n+1}$, $Sr_{n+1}Zr_nSe_{3n+1}$, $Ba_2Sr_{n-1}Zr_nS_{3n+1}$, $Ba_2Sr_{n-1}Zr_nSe_{3n+1}$, $Ba_{n+1}Zr_nS_{3n+1}$, $Ba_{n+1}Zr_nSe_{3n+1}$, $Sr_2Ba_{n-1}$ $Hf_nS_{3n+1}$, $Sr_2Ba_{n-1}Hf_nSe_{3n+1}$, $Sr_{n+1}Hf_nS_{3n+1}$, $Sr_{n+1}Hf_nSe_{3n+1}$, $Ba_2Sr_{n-1}Hf_nS_{3n+1}$, $Ba_2Sr_{n-1}Hf_nSe_{3n+1}$, $Ba_{n+1}Hf_nS_{3n+1}$, and $Ba_{n+1}Hf_nSe_{3n+1}$ Similar to the case of the shell 12, the chalcogenide perovskite that can be applied to the core 11 can also be expressed as $(Sr_xBa_{1-x})(Zr_yHf_{1-y})(S_zSe_{1-z})_3$ or $(Sr_{x'}Ba_{1-x'})_2(Sr_xBa_{1-x})_{n-1}(Zr_yHf_{1-y})_n(S_zSe_{1-z})_{3n+1}$ (where each of x, x', y, and z is a value from 0 to 1).

These substances are materials which are superior in having a band gap suitable for applications that emit visible light, such as a light emitting device, a display device, and a lighting device, when applied to the core 11 of the color conversion particle 10.

<Band Alignment of Core 11 and Shell 12>

As described above, in the core 11 and the shell 12, the band alignment of energy $E_c$ at the lower end of the conduction band and energy $E_v$ at the upper end of the valence band induces the Stokes shift.

The Stokes shift originally indicates that there is an energy difference between an energy state of a photoexcited electron and an electronic state when emitting energy and emitting light in a single substance, and is observed as a difference between maximum energy positions of an absorption spectrum and an emission spectrum.

In a nanoparticle having a heterostructure such as the color conversion particle 10 of the present embodiment, an "apparent Stokes shift," that is, an energy difference between an absorption spectrum end and an emission spectrum peak can be caused by designing an appropriate band alignment at a heterointerface. In the present specification, the apparent Stokes shift that occurs in the heterostructure nanoparticle may be referred simply to as the Stokes shift.

FIGS. 4, 5, and 6 illustrate examples of the band alignment of the core 11 and the shell 12.

In each of FIGS. 4, 5, and 6, the upper side indicates the direction in which the energy increases, the central rectangle indicates a band gap $E_{g\_core}$ of the core 11, and the rectangles on both sides indicate the band gap $E_{g\_shell}$ of the shell 12. The upper side of the central rectangle indicates the energy $E_{c\_core}$ at the lower end of the conduction band of the core 11, and the bottom side of the central rectangle indicates the energy $E_{v\_core}$ at the upper end of the valence band of the core 11. The upper sides of the rectangles on both sides indicate the energy $E_{c\_shell}$ at the lower end of the conduction band of the shell 12, and the bottom sides of the rectangles on both sides indicate the energy $E_{v\_shell}$ at the upper end of the valence band of the shell 12.

In each of FIGS. 4, 5, and 6, a curve drawn on the upper side of the rectangle indicates the distribution of electrons, and a curve drawn on the bottom side of the rectangle indicates the distribution of holes. In addition, a downward arrow in the drawing indicates an energy difference in a light emission process, and an upward arrow in the drawing indicates an energy difference in a light absorption (excitation) process. The Stokes shift is induced when the energy difference in the light absorption process is greater than the energy difference in the light emission process.

In FIGS. 4(a) to 4(e), all of the band gaps $E_{g\_shell}$ of the shell 12 are greater than the band gap $E_{g\_core}$ of the core 11 ($E_{g\_shell} > E_{g\_core}$) On the other hand, in FIGS. 5(a) to 5(e), all of the band gaps $E_{g\_shell}$ of the shell 12 are less than the band gap $E_{g\_core}$ of the core 11 ($E_{g\_shell} < E_{g\_core}$). In addition, in FIGS. 6(a) to 6(c), all of the band gaps $E_{g\_shell}$ of the shell 12 are equal to the band gap $E_{g\_core}$ of the core 11 ($E_{g\_shell} = E_{g\_core}$). Note that the magnitude relationship between $E_{c\_core}$ and $E_{c\_shell}$ and the magnitude relationship between $E_{v\_core}$ and $E_{v\_shell}$ are shown in each of FIGS. 4, 5, and 6.

The Stokes shift is induced in the band alignment (Type I, Quasi-Type II, and Type II) shown in FIGS. 4(a) to 4(e), 5(e), 6(a), and 6(c). Therefore, the color conversion particle of the present embodiment has the band alignment of any of FIGS. 4(a) to 4(e), 5(a), 5(e), 6(a), and 6(c). The band alignment of the color conversion particles of the present embodiment satisfies at least one of a condition that the energy $E_{c\_shell}$ at the lower end of the conduction band of the shell 12 is higher than the energy $E_{c\_core}$ at the lower end of the conduction band of the core 11, and the energy $E_{v\_shell}$ at the upper end of the valence band of the shell 12 is lower than the energy $E_{v\_core}$ at the upper end of the valence band of the core 11 (that is, any one of $E_{c\_shell}>E_{c\_core}$, $E_{v\_shell}<E_{v\_core}$, or $E_{c\_shell}>E_{c\_core}$ and $E_{v\_shell}<E_{v\_core}$).

The band alignments (Type I and Quasi-Type II) of FIGS. 4(b), 4(c), and 4(d) satisfy all the conditions that the energy $E_{c\_shell}$ at the lower end of the conduction band of the shell 12 is equal to or greater than the energy $E_{c\_core}$ at the lower end of the conduction band of the core 11, and the energy $E_{v\_shell}$ at the upper end of the valence band of the shell 12 is equal to or less than the energy $E_{v\_core}$ at the upper end of the valence band of the core 11 (that is, when $E_{g\_shell}>E_{g\_core}$, $E_{c\_shell}\geq E_{c\_core}$ and $E_{v\_shell}\leq E_{v\_core}$).

In the case of Type I represented in FIG. 4(c), electrons and holes are confined in the core 11, and recombination (core emission) occurs in the core 11. In Type I, since holes and electrons are localized in the core 11, the overlap of wave functions is large and the light emission efficiency is high. Therefore, the configuration of Type I is the most preferable as the band alignment of the core 11 and the shell 12. Examples of the material of the core 11 and the shell 12 of Type I represented in FIG. 4(c) include a combination of $BaZrS_3$ as the core 11 and $SrZrS_3$ as the shell 12.

In Quasi-Type II (where $E_{g\_shell}>E_{g\_core}$) represented by FIGS. 4(b) and 4(d), carriers of one of holes or electrons spread in the shell, and thus the light emission efficiency is lower than that of Type I. However, in FIGS. 4(b) and 4(d), since the other carrier is still localized in the core, the light emission efficiency is relatively high, which is the second most preferable after Type I. Examples of the material of the core 11 and the shell 12 of Quasi-Type II represented in FIGS. 4(b) and 4(d) include a combination of $BaHfS_3$ as the core 11 and $CaZrS_3$ as the shell 12, which is shown in FIG. 4(b).

In addition, in the band alignment (Type II) of FIGS. 4(a), 4(e), 5(a), 5(e), 6(a), and 6(c), electrons and holes are separated into the core 11 and the shell 12, and thus light emission due to interband recombination is less likely to occur as compared with Type I. However, in Type II, there is a possibility of recombination (interfacial emission) at the interface between the core 11 and the shell 12, the energy difference is smaller than $E_g$ of the shell 12, and thus the Stokes shift is induced.

In the case of Type II, since light is emitted at the interface between the core 11 and the shell 12, the overlap of wave functions is small, and the light emission efficiency is lower than that of Type I. In addition, interface recombination may be accompanied by non-emissive recombination via interface defects, and thus it is considered that light emission efficiency is lowered also in this respect.

However, Type II is advantageous in that a wide range of emission wavelengths can be realized even in the band alignment of Type II, and application to a near-infrared light emitting material or the like is expected. Examples of the material of the core 11 and the shell 12 of Type II represented in FIGS. 4(a), 4(e), 5(a), 5(e), 6(a), and 6(c) include a combination of $BaZrS_3$ as the core 11 and $CaZrS_3$ as the shell 12, which is shown in FIG. 4(a).

In addition, as shown in FIGS. 4(a) to 4(e), when the band gap $E_{g\_shell}$ of the shell 12 is made greater than the band gap $E_{g\_core}$ of the core 11 ($E_{g\_shell}>E_{g\_core}$), light emitted from the core 11 is hardly absorbed by the shell 12 and is emitted to the outside. As a result, the reabsorption loss in the shell 12 is suppressed, and the light emission efficiency of the color conversion particle 10 can be further improved.

Figures 6A, 6B, 6C:
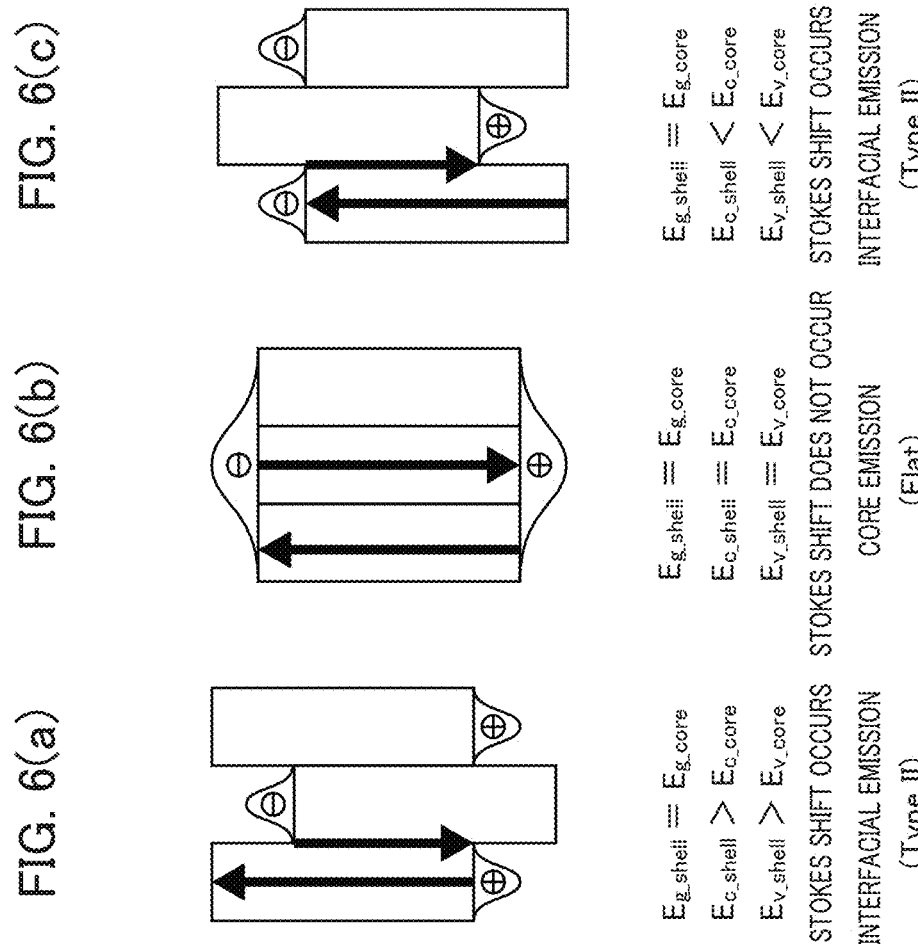
FIGS. 6(a)-6(c) is a diagram showing an example of band alignment of the core and the shell.

In FIGS. 6(a) and 6(c), the band gaps $E_{g\_shell}$ of the shell 12 are equal to the band gap $E_{g\_core}$ of the core 11 ($E_{g\_shell}=E_{g\_core}$) Therefore, in the cases of FIGS. 6(a) and 6(c), light emitted from the core 11 is more likely to be reabsorbed by the shell 12 than in the cases of FIGS. 4(a) to 4(e) ($E_{g\_shell}>E_{g\_core}$), and the reabsorption loss increases. For this reason, the light emission efficiency of the color conversion particle 10 decreases. In addition, when comparing the case where the band gap $E_{g\_shell}$ of the shell 12 is less than the band gap $E_{g\_core}$ of the core 11 ($E_{g\_shell}<E_{g\_core}$) as shown in FIGS. 5(a) and 5(e) with the cases of FIGS. 6(a) and 6(c), in the cases of FIGS. 6(a) and 6(c), the amount of light reabsorbed by the shell 12 is small and the reabsorption loss is suppressed, and thus the light emission efficiency of the color conversion particles 10 can be improved.

Note that the color conversion particles 10 can take various states depending on the combination of the material of the core 11 and the material of the shell 12. The material of the core 11 and the material of the shell 12 exemplified above are sulfides, but may be selenide or a solid solution, and when these are also included, various states can be realized, and there is a combination of the materials of the core 11 and the shell 12 exhibiting excellent light emission characteristics.

<Particle Size of Color Conversion Particle 10>

Here, when an ink in which the color conversion particles 10 are dispersed in a solvent is applied by, for example, an inkjet method, when the particle size of the color conversion particles 10 is extremely large, clogging of the nozzle occurs. In other coating methods, the large particle size of the color conversion particles 10 may be a problem in the process.

For the above reason, the particle size of the color conversion particle 10 is preferably 1000 nm or less.

<Method for Producing Color Conversion Particle 10>

Next, a method for producing the color conversion particle 10 will be described. The color conversion particle 10 is produced by performing a synthesis step of the shell 12 after the synthesis step of the core 11.

(Synthesis Step of Core 11)

In the synthesis step of the core 11, for example, the core 11, which is a nano-light emitting particle, is generated by a known method such as a hot injection method, a solvothermal method, a hydrothermal method, a continuous flow process synthesis method, a composite-hydroxide-mediated (CHM) method, a heat-up method, a gas phase synthesis, a solid phase synthesis, or a mechanochemical synthesis. As a material of the core 11, for example, the above-described substances can be used.

In addition, chalcogenide perovskite may be applied as a material of the core 11. In this case, the core 11 may be synthesized by making the precursor compound react in a solution, the core 11 may be synthesized by mixing and heating the precursor powder in an inert atmosphere or the atmosphere, or the core 11 may be synthesized by mixing and heating the metal precursor powder in an inert atmosphere and making the mixture react with the chalcogen precursor gas.

When the core 11 is synthesized by making the precursor compound react in a solution, for example, a hot injection method, a heat-up method, a solvothermal method, a hydrothermal method, a CHM method, a continuous flow process synthesis method, or the like can be applied.

(Synthesis Step of Shell 12)

In the synthesis step of the shell 12, the chalcogenide perovskite shell 12 is synthesized on the surface of the core 11 obtained in the above step. In this step, the nano-light emitting particles to be the core 11 and the precursor of the chalcogenide perovskite are mixed in a solvent by applying a one-pot synthesis method or a hot injection method. As a result, the color conversion particle 10 having a core-shell structure in which the surface of the core 11 is covered with the shell 12 of chalcogenide perovskite is synthesized. As a method of synthesizing a shell other than the solution, the shell 12 may be generated by, for example, gas phase synthesis by barrel sputtering.

As an example, a case of synthesizing the shell 12 of the chalcogenide perovskite $ABX_3$ in which A and B are made of Group II and Group IV elements, respectively, by applying a hot injection method will be described.

In this case, a first solution containing nano-light emitting particles to be cores, a precursor compound containing Group II elements, a precursor compound containing Group IV elements, and a solvent, and a second solution containing a precursor compound containing chalcogen elements and a solvent are prepared. Then, the second solution is added to the first solution at a temperature in the range of 150° C. to 350° C. in a reaction vessel, and the mixture is held at the above-described temperature for 1 second to 100 hours in the reaction vessel to react. As a result, a compound having an intended core-shell structure is synthesized through a process in which a shell material grows on the nanoparticles used in the reaction. After completion of the reaction, the reaction product is washed with an organic solvent or water, and then the target product is collected.

Examples of the precursor compound containing Group II elements described above include the following compounds.

Metal powders, metal alkoxides, metal carboxylates, metal nitrates, metal perchlorates, metal sulfates, metal acetylacetonates, metal halides, metal hydroxides, metal halides, and combinations thereof Examples of the precursor compound containing Group IV elements described above include the following compounds.

Metal powders, metal alkoxides, metal carboxylates, metal nitrates, metal perchlorates, metal sulfates, metal acetylacetonates, metal halides, metal hydroxides, metal halides, and combinations thereof Examples of the precursor compound containing chalcogen elements described above include the following compounds.

Metal sulfide (including selenium substitute or tellurium substitute);

carbon disulfide (including selenium substitute or tellurium substitute);

hydrogen chalcogenide such as hydrogen sulfide, hydrogen selenide, and hydrogen telluride;

thiol compound (including selenium substitute or tellurium substitute);

phosphine compound such as trioctylphosphine sulfide (including selenium substitute or tellurium substitute);

thiourea (including selenium substitute or tellurium substitute); and sulfur, selenium, tellurium, or dispersions of these compounds in solvents such as amines, acids, and hydrocarbons, and combinations thereof Examples of the solvent include the following solvents.

Primary amine, secondary amine, and tertiary amine having an organic group such as a hydrocarbon group;

aromatic hydrocarbon;

nitrogen-containing heterocyclic compound, oxygen-containing heterocyclic compound, sulfur-containing heterocyclic compound, selenium-containing heterocyclic compound, and tellurium containing heterocyclic compound;

aliphatic hydrocarbon;

phosphine compound having an organic group such as a hydrocarbon group;

phosphine oxide compound having an organic group such as a hydrocarbon group; and a commonly used organic solvent containing at least one of an alcohol, an aldehyde, a carboxylic acid or a compound thereof containing a sulfur-substituted group, a selenium-substituted group, a tellurium-substituted group, or water, or, a combination of these solvents The heating of the solution includes making a precursor of the chalcogen element react to form hydrogen chalcogenide. The reaction of the above solution includes synthesis under an inert atmosphere or an air atmosphere. Further, the reaction of the above solution may synthesize a target product in a continuous flow process using a microreaction vessel.

Furthermore, in the synthesis of the shell 12 described above, first, a nano-light emitting particle to be the core 11 may be synthesized, and the shell 12 may be continuously synthesized, or a shell precursor may be added to a reaction vessel at the time of synthesizing the nano-light emitting particle to synthesize the color conversion particle 10 having a target core-shell structure.

<External Structure of Color Conversion Particle 10>

Figure 1B:
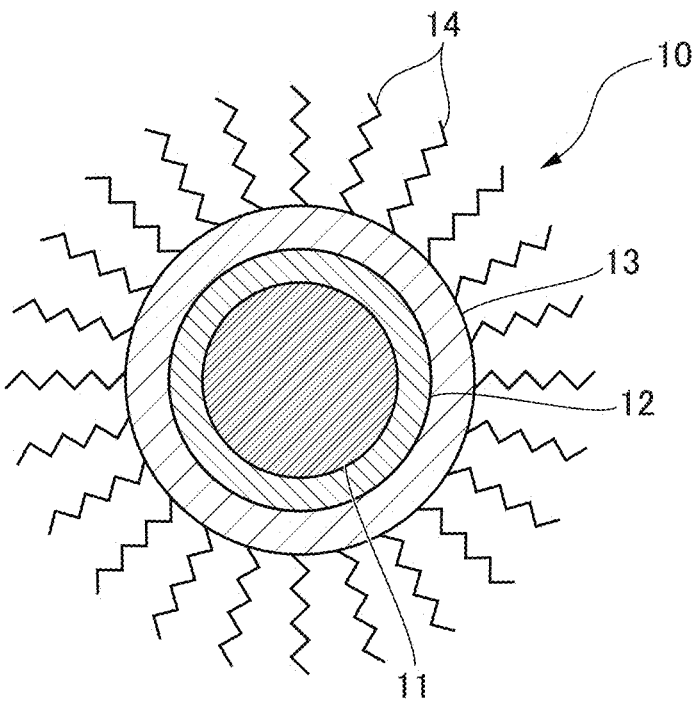

As shown in FIG. 1(b), the color conversion particle 10 may have an outer shell 13 or a ligand 14 as a protective layer as an external structure.

(Outer Shell 13)

The outer shell 13 is a protective layer that covers the semiconductor particles including the core 11 and the shell 12 from the outside. The outer shell 13 is provided to further improve durability of the color conversion particles 10 by suppressing deterioration of the semiconductor particles due to oxygen contact and protecting the semiconductor particles from chemical interaction with the outside. The outer shell 13 has a property of transmitting target excitation light and light emission of the core 11.

The outer shell 13 is formed by a known method using a chemically stable substance such as silica, glass, an oxide insulator, or a resin.

For example, when the outer shell 13 is formed of a metal oxide, silicon oxide, zirconium oxide, titanium oxide, aluminum oxide, or the like can be used as a material. The outer shell 13 containing the metal oxide can be formed by, for example, a method of forming an inorganic oxide by a thermosetting reaction using a sol-gel method.

The outer shell 13 may be a layer containing a resin, a polysilazane modified product, or the like. Polysilazane is a polymer having a silicon-nitrogen bond, and is a ceramic precursor inorganic polymer containing $SiO_2$ composed of Si—N, Si—H, N—H and the like, $Si_3N_4$, an intermediate solid solution $SiO_xN_y$ of both, and the like. When the outer shell 13 is formed of a resin, it is preferable that the outer shell is formed of a water-soluble resin such as a polyvinyl alcohol-based resin from the viewpoint of ease of production.

The outer shell 13 may have a multilayer structure including both a metal oxide layer and a layer containing a resin, a polysilazane modified product, or the like.

(Ligand 14)

The ligand 14 is an organic modified molecule that surface-modifies the color conversion particle 10, and is bonded to the outer surface of the color conversion particle 10 or provided to cover the color conversion particle 10.

The ligand 14 has a function of easily isolating the color conversion particles 10 from each other to enhance dispersibility, and preventing regrowth, destruction, and the like due to contact between the color conversion particles 10. In addition, the ligand 14 also has a function of suppressing surface defects of the shell 12 by capping of the tangling bond and improving light emission efficiency.

As the modified organic molecule as the ligand 14, a modified organic molecule having a structure having a nitrogen-containing functional group, a sulfur-containing functional group, an acidic group, an amide group, a phosphine group, a phosphine oxide group, a hydroxyl group, a linear alkyl group, a carboxyl group, a phosphon group, a sulfone group, an amine group, or the like can be used. Examples of such a modified organic molecule include sodium hexametaphosphate, sodium laurate, sodium dodecyl sulfate, sodium dodecylbenzene sulfonate, triethanolamine lauryl sulfate, lauryl diethanolamide, dodecyltrimethylammonium chloride, trioctylphosphine, and trioctylphosphine oxide.

In addition, as the modified organic molecule as the ligand 14, it is preferable to use a compound having a hydrophilic group and a hydrophobic group in the molecule. As a result, the color conversion particle 10 can be covered with the ligand 14 in both a chemical bond in which a hetero atom is coordinate-bonded and a bond by physical adsorption. Examples of this type of modified organic molecule include amines which are compounds having a nonpolar hydrocarbon terminal as a hydrophobic group and an amino group as a hydrophilic group. When the hydrophilic group of the modified organic molecule is an amine, the amine can be firmly bonded to the metal element.

The modified organic molecule as the ligand 14 preferably has a hetero atom. When the modified organic molecule has a hetero atom, electrical polarity between the hetero atom and the carbon atom occurs, and the modified organic molecule can be firmly bonded to the outer surface of the color conversion particle. Here, the "hetero atom" means all atoms except a hydrogen atom and a carbon atom.

<Modification Example of Color Conversion Particle>

Next, a modification example of the color conversion particle 10 will be described with reference to FIGS. 7 and 8. In the schematic diagrams of the color conversion particle 10 shown in FIGS. 7 and 8, only the core 11 and the shell 12 are shown unless otherwise specified. However, these color conversion particles 10 may each have the outer shell 13 and the ligand 14, similar to the example of FIG. 1(*b*).

For example, as shown in FIG. 7(*a*), the shell 12 of the color conversion particle 10 does not necessarily cover the entire core 11, and a part of the core 11 may be exposed to the outside.

For example, as shown in FIG. 7(*b*), the color conversion particle 10 may have a structure in which a plurality of shells 12 are laminated and covered outside one core 11. By using different materials such as a composition and a crystal structure as the material of each shell 12, the light absorption characteristics and the light emission characteristics of the entire color conversion particles 10 can be adjusted. In the example of FIG. 7(*b*), an example in which the two-layer shells 12*a* and 12*b* are laminated on the core 11 is shown, but the shell 12 of the color conversion particle 10 may have three or more layers.

The color conversion particle 10 having the multilayered shells 12*a* and 12*b* shown in FIG. 7(*b*) can be formed by heating a solution containing a semiconductor particle in which the shell 12*a* is formed on the core 11 and another shell precursor.

For example, the color conversion particle 10 may have a structure in which the plurality of cores 11 are included in the shell 12 as shown in FIG. 7(*c*). When the plurality of cores 11 are included in the shell 12, the thickness of the effective shell 12 in the color conversion particles 10 can increase and the durability of the color conversion particles 10 can be improved. In addition, using different materials such as a composition and a crystal structure in each of the cores 11, the light absorption characteristics and the light emission characteristics of the entire color conversion particles 10 can be adjusted.

In the example of FIG. 7(*c*), a structure in which three cores 11 are included in the shell 12 is shown, but the number of cores 11 included in the shell 12 can be appropriately changed. In the color conversion particle 10 having the plurality of cores 11, any of the cores 11 may be partially exposed to the outside of the shell 12.

In addition, the color conversion particle 10 may have a structure including a plurality of cores 11 in the shell 12 and the shell 12 having a plurality of layers. For example, as shown in FIG. 7(*d*), the outer side of the shell 12*a* including the plurality of cores 11 may further be covered with the shell 12*b*. In addition, the shell may further be laminated on the outer side of the shell 12*b* in FIG. 7(*d*).

For example, as shown in FIG. 7(*e*), the plurality of cores 11 each covered with the shell 12*a* may be covered with the shell 12*b* and integrated to form the color conversion particle 10. In the example of FIG. 7(*e*), each of the shells 12*a* may include the plurality of cores 11.

The core 11 of the color conversion particle 10 may contain a light absorbing material 17 made of the same type of material as the shell 12. For example, as shown in FIG. 7(*f*), the outer side of the light absorbing material 17 may be covered with the core 11. Note that the material of the light absorbing material 17 may be, for example, a material that can be selected as the material of the shell 12, and the shell 12 covering the core 11 and the light absorbing material 17 may not be made of the same material.

In the structure of the laminated core having the light absorbing material 17 inside as described above, the excitation light transmitted through the outer shell 12 is absorbed by the light absorbing material 17 (the same type of material of the shell 12) inside the core 11, and the excitation light absorption rate can be improved. In addition, in the structure of the laminated core having the light absorbing material 17 therein, the photoexcited carriers are effectively confined in the narrow region of the core 11 sandwiched between the materials of the shell 12, and accordingly, the light emission efficiency can be improved.

In addition, the band alignment of the light absorbing material 17 and the core 11 is preferably Type I, and the band alignment of the core 11 and the shell 12 is also preferably Type I. Examples thereof include a combination of $SrZrS_3$ as the light absorbing material 17 and $BaZrS_3$ as the core 11, and further, a combination of $SrZrS_3$ as the shell 12. Another examples thereof include a combination of $SrHfS_3$ as the light absorbing material 17 and $BaHfS_3$ as the core 11, and further, a combination of $SrHfS_3$ as the shell 12. Note that the light absorbing material 17 and the core 11 may be a combination of materials whose the band alignment induces the Stokes shift, and the light absorbing material 17 may be a material other than the chalcogenide perovskite.

Further, the color conversion particle 10 may have a hollow structure having a void 16 therein. For example, as shown in FIG. 8(*a*), one or more voids 16 may be formed in the core 11. Alternatively, as shown in FIG. 8(*b*), in the color conversion particle 10 having the outer shell 13 outside the shell 12, the void 16 may be formed between the shell 12 and the outer shell 13. By forming the voids 16 that do not absorb or emit light inside the color conversion particles 10, the optical characteristics and shape of the color conversion particles 10 can be adjusted.

The color conversion particle 10 having a hollow structure shown in FIGS. 8(*a*) and 8(*b*) can be produced, for example, as follows. First, by simultaneously adding an organic substance such as fullerene or carbon nanotube or a soluble salt at the time of synthesis, semiconductor particles containing the organic substance or salt are generated. Thereafter, the organic substance or salt is dissolved using a solvent, or the organic substance or salt is ashed at a high temperature, and accordingly the color conversion particles 10 having a hollow structure can be obtained.

In addition, the core 11 or the shell 12 of the color conversion particle 10 may contain a foreign substance that does not absorb and emit light, such as an insulator or other composition. By including the foreign substance in the core 11 or the shell 12, for example, the light emission efficiency of the color conversion particle 10 can be improved by scattering light, and the shape of the color conversion particle 10 can be adjusted.

In addition, as shown in FIG. 8(*c*), the core 11 or the shell 12 of the color conversion particle 10 may have a gradient structure in which physical properties, such as composition, crystal structure, lattice constant, density, crystal orientation, carrier concentration, band gap, defect density, dielectric constant, and conductivity, continuously change in a direction (depth direction) perpendicular to the interface. By continuously changing the physical properties or chemical properties of the core 11 or the shell 12 to form a gradient shape in the depth direction, lattice matching can be enhanced, and lattice defects can be reduced. As a result, non-emissive recombination can be reduced, and the light emission efficiency of the color conversion particles can be enhanced.

Note that the gradient structure described above can be produced by, for example, the same method as in the case of producing the multilayer core 11 or shell 12.

Furthermore, in the present invention, the shape of the color conversion particle to be synthesized is not particularly limited. For example, spherical, elongated, star-shaped, polyhedral, pyramidal, tetrapod-shaped, tetrahedral, platelet, conical, irregularly shaped cores 11 and/or color conversion particles 10 can be synthesized.

Hereinafter, effects of the color conversion particle of the present embodiment will be described.

The color conversion particle 10 of the present embodiment includes the core 11 and the shell 12 that contains the core 11 and absorbs excitation light, and emits light at the core 11 or at the interface between the core 11 and the shell 12 upon receiving the irradiated excitation light. The chalcogenide perovskite which is a material of the shell 12 has a high light absorption coefficient and excellent durability. Therefore, in the present embodiment, since the core 11 is covered with the chalcogenide perovskite shell 12, the color conversion particles 10 have high durability against heat and other disturbances. In addition, as compared with conventional quantum dots and the like, the color conversion particles are less likely to deteriorate in performance even when the ligand is desorbed due to heat or other disturbances.

In addition, the core 11 and the shell 12 have band alignment that induces the Stokes shift. In the present embodiment, by utilizing the difference between the band end transition energy of the shell 12 and the band end transition energy of the core 11, the photoexcited carriers are transported to the core 11 by the chalcogenide perovskite shell 12 having high absorbance, and the photoexcited carriers confined in the core 11 are recombined and emitted.

In the present embodiment, the part responsible for absorption and the part responsible for light emission are separated in the color conversion particle 10 by forming the chalcogenide perovskite shell 12 outside the core 11. Accordingly, it is possible to take a large Stokes shift, and the absorbance can be gained by the shell 12 without enlarging the core 11. Therefore, it is possible to achieve high absorbance and high light emission efficiency while suppressing light emission reabsorption loss by the core 11.

In addition, since the color conversion particle 10 of the present embodiment has high absorbance and light emission efficiency as described above, a desired color conversion function can be realized with a smaller amount as compared with conventional quantum dots and the like. In other words, for example, in a case where the color conversion particle 10 of the present embodiment is applied to a color conversion layer of a display device, a lighting device, or the like, it is possible to reduce the thickness of the color conversion layer and improve the yield. In the formation of the color conversion layer, the probability of occurrence of a defect in the film formation process increases by repeating the film formation process many times, and as a result, the yield of the color conversion layer decreases. Conversely, when the color conversion layer can be thinned, the film formation process can be reduced, and thus the effective defect rate of the color conversion layer can be reduced.

In addition, when the band gap of the shell 12 is made greater than the band gap of the core 11, the light emitted from the core 11 is hardly absorbed by the shell 12 and is emitted to the outside, and thus the reabsorption loss in the shell can also be suppressed. That is, when the band gap of the shell 12 is greater than the band gap of the core 11, absorbance can be gained by thickening the shell 12 without increasing reabsorption loss, and thus the light emission efficiency in the color conversion particles 10 can be further improved.

When the band gap of the shell 12 is 3.4 eV or less, ultraviolet excitation light (wavelength 365 nm) by the GaN LED can be effectively absorbed. In this case, by using a single LED of ultraviolet light and the color conversion particles 10 that perform color conversion into each color of RGB by ultraviolet excitation light, each color of RGB can be emitted without using an LED (light source) having a plurality of emission wavelengths, and thus the light emitting element can be simplified.

Furthermore, when the core 11 is a chalcogenide perovskite, the absorbance and durability of the core 11 can be increased, and the light emission efficiency can be further improved by reducing defects at the core-shell interface.

<Product Form and Application Example of Color Conversion Particle 10>

Next, a product form and an application example of the color conversion particle 10 will be described. Examples of the product form of the color conversion particle 10 include a powder, a solution, a thin film, and a sheet. As an application example of the color conversion particle 10, application to various devices is assumed.

(Powder)

The powder is in a state where the color conversion particles 10 are aggregated. Hereinafter, the color conversion particles 10 may be referred to as primary particles, and those in which the color conversion particles 10 are aggregated may be referred to as secondary particles. The sizes of the primary particles and the secondary particles are not particularly limited, but the primary particles are preferably in the range of 5 nm to 1000 nm. In addition, a ligand may be given to the surface of the primary particle or the secondary particle. In order to improve characteristics such as light emission characteristics, dispersibility of the color conversion particles, and film formability, another material may be added to the powder of the color conversion particles 10 as an additive.

The application of the powder of the color conversion particles 10 is not particularly limited. For example, a solution may be prepared by being dispersed in a solvent, a composite may be prepared by being dispersed in a resin or a solid medium, a sputtering target may be used as a sintered body, or a powder itself may be used as a source of a vapor deposition source or the like.

Solution

The solution is in a state where the color conversion particles 10 are dispersed in a solvent. The sizes of the primary particles and the secondary particles are not particularly limited, but the primary particles are preferably in the range of 5 nm to 1000 nm. The term "dispersed" refers to a state where the color conversion particles 10 are floating or suspended in a solvent, and a part thereof may be settled. In addition, a ligand may be given to the surface of the primary particle or the secondary particle.

As the solvent of the solution, one or more types of solvents may be used. Examples of the type of the solvent include those described below, and are not limited thereto.

Water, esters such as methyl formate, ethyl formate, propyl formate, pentyl formate, methyl acetate, ethyl acetate, and pentyl acetate; ketones such as γ-butyrolactone, acetone, dimethyl ketone, diisobutyl ketone, cyclopentanone, cyclohexanone, and methylcyclohexanone; ethers such as diethyl ether, methyl-tert-butyl ether, diisopropyl ether, dimethoxymethane, dimethoxyethane, 1,4-dioxane, 1,3-dioxolane, 4-methyldioxolane, tetrahydrofuran, methyltetrahydrofuran, anisole, and phenetol; alcohols such as methanol, ethanol, 1-propanol, 2-propanol, 1-butanol, 2-butanol, tert-butanol, 1-pentanol, 2-methyl-2 butanol, methoxypropanol, diacetone alcohol, cyclohexanol, 2-fluoroethanol, 2,2,2-trifluoroethanol, and 2,2,3,3-tetrafluoro-1 propanol; glycol ethers such as ethylene glycol monomethyl ether, ethylene glycol monoethyl ether, ethylene glycol monobutyl ether, ethylene glycol monoethyl ether acetate, and triethylene glycol dimethyl ether; organic solvents having an amide group such as N-methyl-2 pyrrolidone, N,N-dimethylformamide, acetamide, and N,N-dimethylacetamide; organic solvents having a nitrile group, such as acetonitrile, isobutyronitrile, propionitrile, or methoxyacetonitrile; organic solvents having a carbonate group such as ethylene carbonate or propylene carbonate; organic solvents having halogenated hydrocarbon group such as methylene chloride or chloroform; organic solvents having a hydrocarbon group such as n-pentane, cyclohexane, n-hexane, benzene, toluene, or xylene; and dimethyl sulfoxide.

In addition, an acid, a base, a binder material, or the like may be added to the above solution as an additive in order to improve characteristics such as light emission characteristics, dispersibility of the color conversion particles 10, and film formability.

The application of the solution is not particularly limited. For example, the solution may be used for film formation by a coating method, a spraying method, or a doctor blade method (other solution film formation methods), preparation of a composite by compounding with a solid dispersion medium, or preparation of a device using them.

(Thin Film)

The thin film is a state where the color conversion particles 10 are aggregated in a planar shape. The sizes of the primary particles and the secondary particles are not particularly limited, but the primary particles are preferably in the range of 5 nm to 1000 nm. In addition, a ligand may be given to the surface of the primary particle or the secondary particle. In order to improve characteristics such as light emission characteristics, and dispersibility of the color conversion particles 10, another material may be added to the thin film described above as an additive.

The method for producing the thin film is not particularly limited. For example, the thin film may be prepared by producing a film using a coating method, a spraying method, a doctor blade method, an inkjet method, or other solution film formation methods, using a vacuum process such as a sputtering method or a vacuum vapor deposition method. In addition, the color conversion particles 10 may be formed into a film by coating or other methods, and then the particle shape may not be maintained by firing or other processing.

(Sheet)

The sheet is in a state where the dispersion medium in which the color conversion particles 10 are dispersed is planar. The sizes of the primary particles and the secondary particles are not particularly limited, but the primary particles are preferably in the range of 5 nm to 1000 nm. In addition, a ligand may be given to the surface of the primary particle or the secondary particle.

As the material used as the dispersion medium of the sheet, a polymer well known to those skilled in the art that can be used for this type of purpose can be applied in any manner. In a suitable embodiment, polymers of this type are substantially translucent or substantially transparent.

For example, polymers applicable as a dispersion medium of a sheet include polyvinyl butyral, polyvinyl acetate, silicone, and derivatives of silicone, but are not limited thereto. In addition, derivatives of silicone include polyphenylmethylsiloxane, polyphenylalkylsiloxane, polydiphenylsiloxane, polydialkylsiloxane, fluorinated silicones and vinyl and hydride substituted silicones, ionomers, polyethylene, polyvinyl chloride, polyvinylidene chloride, polyvinyl alcohol, polypropylene, polyester, polycarbonate, polystyrene, polyacrylonitrile, ethylene vinyl acetate copolymer, ethylene-vinyl alcohol copolymer, ethylene-methacrylic acid copolymer film, nylon, and the like, but are not limited thereto.

In order to improve characteristics such as light emission characteristics and dispersibility of the color conversion particles 10, silica fine particles or other materials such as the solvent described in the above solution may be added to the sheet described above as an additive.

The method for producing the sheet is not particularly limited. For example, a sheet may be produced by kneading and stretching a powder and a dispersion medium, or a sheet may be produced by mixing and applying an ink containing the color conversion particles 10 and a dispersion medium or a precursor thereof.

(Device)

As an application of the color conversion particles 10, or the powder, solution, film, or sheet described above, application to down-conversion such as ultraviolet light or blue light in various devices is assumed. Examples of the type of device include a light emitting device such as an LED or an organic EL, a display device including the light emitting device, a lighting device including the light emitting device, an image sensor, a photoelectric conversion device, a bio-luminescent label, and the like.

Example

Hereinafter, an example of the color conversion particle of the present invention will be described.

In the color conversion particles of the example, the material of the core is $BaZrS_3$, and the material of the shell is $SrZrS_3$. That is, in the color conversion particles of the example, the core and the shell are chalcogenide perovskites, and correspond to an example of a combination of the best materials that induce the Stokes shift. As described above, when the core and the shell are chalcogenide perovskites, interface defects between the core and the shell are reduced, and high light emission efficiency can be expected.

Figure 9:
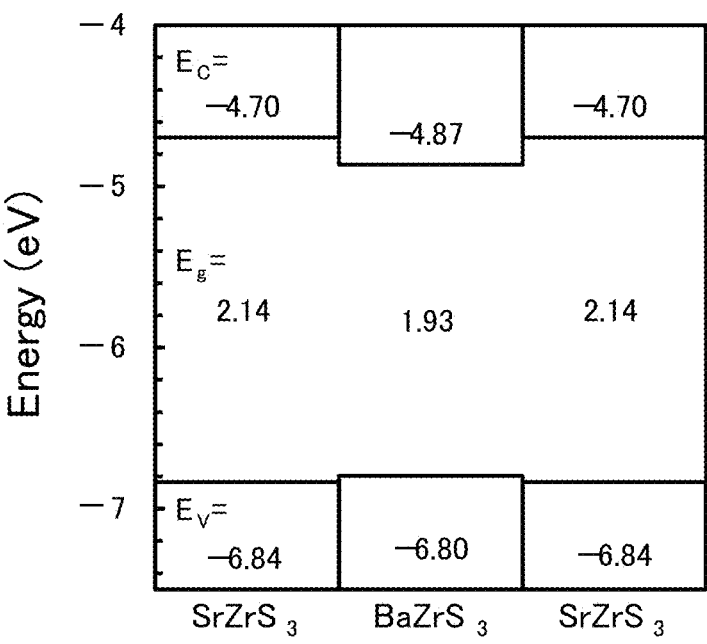
FIG. 9 is a diagram showing band alignment of the core and the shell in an example.

FIG. 9 is a diagram showing band alignment of shell/core/shell in the color conversion particles of the example. The origin of the energy on the vertical axis is a vacuum level. The physical property values of the core and the shell were determined in a comprehensive manner from other experimental result reports with reference to Literature "Y. Nishigaki et al., Sol. RRL 1900555 (2020)." and Literature "K. Hanzawa et al., J. Am. Chem. Soc. 141, 5343 (2019)."

As shown in FIG. 9, since $E_c$ of the core is lower than $E_c$ of the shell and $E_v$ of the core is higher than $E_v$ of the shell, the band alignment of the shell and the core in the example is Type I. Therefore, in the configuration of the example, it is expected that the excitation light is absorbed by the shell, and the excited carriers move to the core and recombine to emit the core light. In addition, in the example, since the band gap $E_g$ of the shell is greater than the band gap $E_g$ of the core, suppression of the reabsorption loss in the shell is also expected.

In the example, one-dimensional simulations were conducted using software (SCAPS-1D) for the absorption and emission of the color conversion particles. FIGS. 10(a)-10(d) is a diagram showing a result of simulation of the example. The horizontal axes in each drawing of FIGS. 10(a)-10(d) respectively represent the one-dimensional position in the diameter direction of the color conversion particle.

In the simulation, the diameter of the core was set to 20 nm, and the thickness of the shell was set to 50 nm. In addition, the wavelength of the excitation light was set to blue light of 450 nm, and the excitation light was set to be incident from one side (left side in the drawing) at an illuminance of 100 mW/cm$^2$.

Figures 10A, 10B, 10C, 10D:
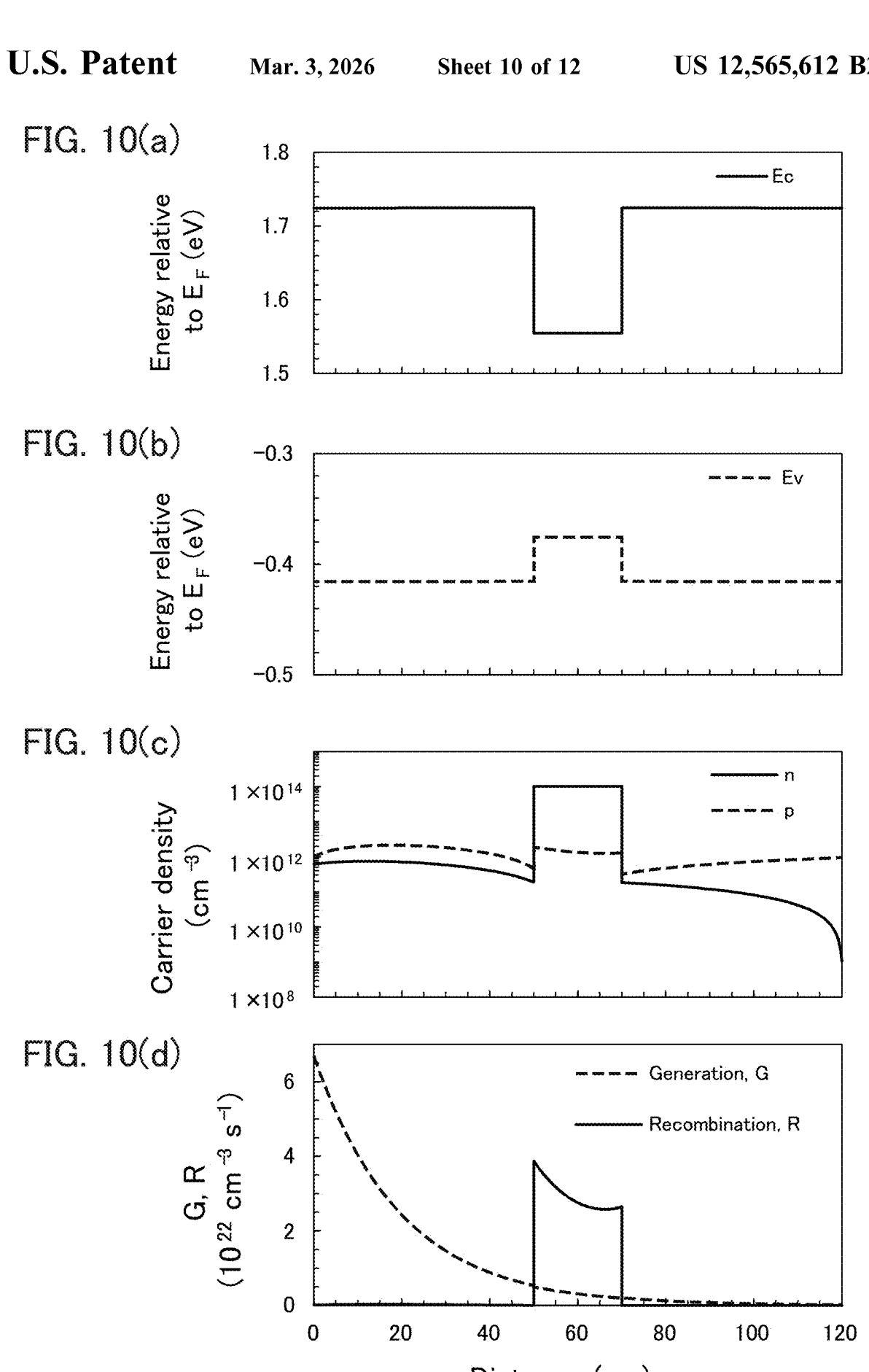
FIGS. 10(a)-10(d) is a diagram showing a result of simulation of the example.

FIG. 10(a) shows a profile of $E_c$ of the color conversion particle, and FIG. 10(b) shows a profile of $E_v$ of the color conversion particle. The energy on the vertical axis is based on the Fermi energy $E_F$.

In FIG. 10(a), $E_c$ in a core range (the range in which the value on the horizontal axis is 50 nm to 70 nm) is lower than $E_c$ in the shell range. In FIG. 10(b), $E_v$ in the core range is higher than $E_v$ in the shell range. The profiles in FIGS. 10(a) and 10(b) match well with the band alignment shown in FIG. 9.

FIG. 10(c) shows the carrier concentration distribution of the color conversion particles. A solid line in FIG. 10(c) indicates a profile of an electron, and a broken line in FIG. 10(c) indicates a profile of a hole.

In FIG. 10(c), the carrier density in the core range (the range in which the value on the horizontal axis is 50 nm to 70 nm) is higher than that in the shell range. Therefore, it can be seen in FIG. 10(c) that carriers excited by light absorbed by the shell are effectively moved to the core and confined.

FIG. 10(d) shows a generation rate and a recombination rate of carriers. The broken line in FIG. 10(d) indicates the profile of the generation rate of the carriers, and the solid line in FIG. 10(d) indicates the profile of the recombination rate of the carriers.

As shown in FIG. 10(d), the generation rate of the carriers is the highest on the left side in the drawing where the excitation light is incident. In addition, since the light absorption coefficient of the chalcogenide perovskite is extremely large, the generation rate of the carriers rapidly decreases toward the right side in the drawing. It can be seen that most of the carrier excitation by light absorption occurs in the shell range of 0 nm to 50 nm.

On the other hand, the recombination rate of the carriers shows a high value over the core range (the range in which the value of the horizontal axis is 50 nm to 70 nm), and the value is almost 0 in the shell range. That is, light emission due to carrier recombination is mostly caused by photoexcited carriers that have moved to the core.

Therefore, it can be seen from the result of simulation that transport of the photoexcited carriers from the shell to the core and confinement of the photoexcited carriers to the core effectively occur.

In addition, light absorption coefficients of $BaZrS_3$ and $SrZrS_3$ and photoluminescence (PL) emission peaks of $BaZrS_3$ were respectively calculated based on the optical coefficients of $BaZrS_3$ and $SrZrS_3$ indicated in the above "Y. Nishigaki et al., Sol. RRL 1900555 (2020)."

Figure 11:
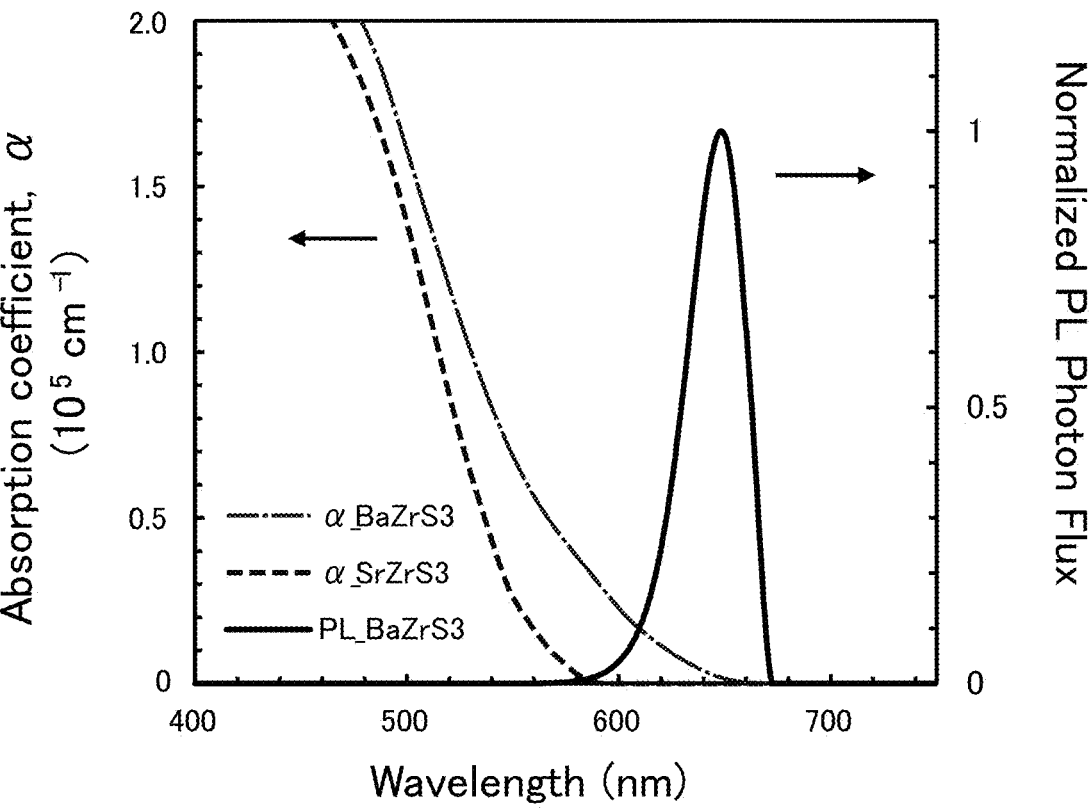
FIG. 11 is a diagram showing respective profiles of light absorption coefficients of $BaZrS_3$ and $SrZrS_3$ and a PL emission spectrum of $BaZrS_3$.

FIG. 11 is a diagram showing respective profiles of the light absorption coefficients of $BaZrS_3$ and $SrZrS_3$ and PL emission spectrum of $BaZrS_3$. In FIG. 11, the horizontal axis represents the wavelength.

The PL emission spectrum (solid line in FIG. 11) of $BaZrS_3$, which is a material of the core, shows a sharp emission peak having a half-value width of approximately 30 nm. This is because the absorption end (the rise of the light absorption coefficient near the band end) of the chalcogenide perovskite is extremely steep.

In addition, an alternate long and short dash line in FIG. 11 indicates the profile of the light absorption coefficient of $BaZrS_3$, and a broken line in FIG. 11 indicates the profile of the light absorption coefficient of $SrZrS_3$. In a region where the profile of the PL emission spectrum overlaps with the tail part of the profile of the light absorption coefficient, the light emission can be reabsorbed.

That is, it can be seen that light emission can be reabsorbed when color conversion is performed only with $BaZrS_3$ that is a material of the core. Therefore, in the case of the core of $BaZrS_3$, when the particle size is increased in order to gain the absorbance, the reabsorption is also increased, and thus the magnitude of the absorbance and the loss of the reabsorption are in a trade-off relationship.

On the other hand, the tail part of the profile of the light absorption coefficient of SrZrS$_3$ hardly overlaps with the profile of the PL emission spectrum of BaZrS$_3$. Therefore, it can be seen that when the shell of SrZrS$_3$ is applied to the core of BaZrS$_3$, reabsorption in the shell hardly occurs.

In the example, the color conversion particles have a core-shell structure, and SrZrS$_3$, which is a shell material having a greater band gap than BaZrS$_3$ of the core, gains the absorbance of the excitation light. Therefore, in the configuration of the example, the thickness of the shell can be increased to gain the absorbance without increasing the reabsorption loss.

FIG. 12 is a diagram showing a correspondence between the combination of materials of the core and the shell, and the type of the band alignment and expression of the Stokes shift in the example and the comparative example. In FIG. 12, the type of band alignment and the presence or absence of expression of the Stokes shift are shown in association with 16 combinations (4×4=16) in a case where four types of materials of SrZrS$_3$, BaZrS$_3$, SrHfS$_3$, and BaHfS$_3$ are applied to the materials of the core and the shell.

In FIG. 12, a combination of materials in which the Stokes shift is induced (Yes) is an example, and a combination of materials in which the Stokes shift is not induced (No) is a comparative example. Here, in FIG. 12, in cases where the core and the shell are the same material, the types of band alignment are all Flat, and in these cases, the Stokes shift is not induced.

In FIG. 12, when the material of the core is SrZrS$_3$ and the material of the shell is BaZrS$_3$, the type of the band alignment is Inverse Type I, and the Stokes shift is not induced in this combination. On the other hand, when the material of the core is SrZrS$_3$ and the material of the shell is SrHfS$_3$ or BaHfS$_3$, the types of band alignments are all Type II, and the Stokes shift is induced in any of these combinations.

In FIG. 12, when the material of the core is BaZrS$_3$ and the material of the shell is SrZrS$_3$, the type of the band alignment is Type I. In addition, in a case where the material of the core is BaZrS$_3$ and the material of the shell is SrHfS$_3$ or BaHfS$_3$, the types of band alignments are all Type II. Both of these combinations express the Stokes shift.

In FIG. 12, when the material of the core is SrHfS$_3$ and the material of the shell is SrZrS$_3$ or BaZrS$_3$, the types of band alignments are all Type II, and the Stokes shift is induced in any of these combinations. On the other hand, when the material of the core is SrHfS$_3$ and the material of the shell is BaHfS$_3$, the type of the band alignment is Inverse Type I, and the Stokes shift is not induced in this combination.

In FIG. 12, in a case where the material of the core is BaHfS$_3$ and the material of the shell is SrZrS$_3$ or BaZrS$_3$, the types of band alignments are all Type II. In addition, when the material of the core is BaHfS$_3$ and the material of the shell is SrHfS$_3$, the type of the band alignment is Type I. Both of these combinations express the Stokes shift.

Note that, in both the case where the material of the core is BaZrS$_3$ and the material of the shell is SrZrS$_3$ and the case where the material of the core is BaHfS$_3$ and the material of the shell is SrHfS$_3$, the type of band alignment is Type I, and thus, it is possible to obtain color conversion particles particularly excellent in light emission characteristics.

As described above, the embodiment of the present invention has been described, but the embodiment is presented as an example, and is not intended to limit the scope of the present invention. The embodiments can be implemented in various forms other than the above, and various omissions, substitutions, changes, and the like can be made without departing from the gist of the present invention. Embodiments and modifications thereof are included in the scope and gist of the present invention, and the invention described in the claims and equivalents thereof are also included in the scope and gist of the present invention.

REFERENCE SIGNS LIST

10 Color conversion particle
11 Core
12, 12*a*, 12*b* Shell
13 Outer shell
14 Ligand
16 Void

The invention claimed is:

1. A color conversion particle comprising:
a core; and
a shell that contains the core and absorbs excitation light, wherein
light is emitted at the core or at an interface between the core and the shell upon receiving the irradiated excitation light,
the shell is composed of a chalcogenide perovskite, and
the core and the shell have band alignment that induces a Stokes shift.

2. The color conversion particle according to claim 1, wherein
the chalcogenide perovskite has a crystal structure of any one of crystal structures of a cubic perovskite, a tetragonal perovskite, a GdFeO$_3$ orthorhombic perovskite, a Ruddlesden-Popper layered perovskite, a Dion-Jacobson layered perovskite, and a double perovskite.

3. The color conversion particle according to claim 1, wherein
the chalcogenide perovskite has a chemical formula of ABX$_3$ or A'$_2$A$_{n-1}$B$_n$X$_{3n+1}$, wherein A and A' are Group 2 elements, B is a Group 4 element, X is a chalcogen element, and n is an integer of 1 or more.

4. The color conversion particle according to claim 3, wherein
the A, the A', the B, and the X include a mixture of elements of respective groups at any ratio.

5. The color conversion particle according to claim 1, wherein
the chalcogenide perovskite is selected from any one of SrZrS$_3$, SrZrSe$_3$, SrHfS$_3$, SrHfSe$_3$, BaZrS$_3$, BaZrSe$_3$, BaHfS$_3$, BaHfSe$_3$, Sr$_2$Ba$_{n-1}$Zr$_n$S$_{3n+1}$, Sr$_2$Ba$_{n-1}$Zr$_n$Se$_{3n+1}$, Sr$_{n+1}$Zr$_n$S$_{3n+1}$, Sr$_{n+1}$Zr$_n$Se$_{3n+1}$, Ba$_2$Sr$_{n-1}$Zr$_n$S$_{3n+1}$, Ba$_2$Sr$_{n-1}$Zr$_n$Se$_{3n+1}$, Ba$_{n+1}$Zr$_n$S$_{3n+1}$, Ba$_{n+1}$Zr$_n$Se$_{3n+1}$, Sr$_2$Ba$_{n-1}$Hf$_n$S$_{3n+1}$, Sr$_2$Ba$_{n-1}$Hf$_n$Se$_{3n+1}$, Sr$_{n+1}$Hf$_n$S$_{3n+1}$, Sr$_{n+1}$Hf$_n$Se$_{3n+1}$, Ba$_2$Sr$_{n-1}$Hf$_n$S$_{3n+1}$, Ba$_2$Sr$_{n-1}$Hf$_n$Se$_{3n+1}$, Ba$_{n+1}$Hf$_n$S$_{3n+1}$, and Ba$_{n+1}$Hf$_n$Se$_{3n+1}$, wherein n is an integer of 1 or more.

6. The color conversion particle according to claim 1, wherein
the chalcogenide perovskite is (Sr$_x$Ba$_{1-x}$)(Zr$_y$Hf$_{1-y}$)(S$_z$Se$_{1-z}$)$_3$ or (Sr$_x$Ba$_{1-x'}$)$_2$(Sr$_x$Ba$_{1-x}$)$_{n-1}$(Zr$_y$Hf$_{1-y}$)$_n$(S$_z$Se$_{1-z}$)$_{3n+1}$, wherein each of x, x', y, z is a value from 0 to 1, and n is an integer of 1 or more.

7. The color conversion particle according to claim 1, wherein
the band alignment satisfies at least one of a condition that energy E$_{c\_shell}$ at a lower end of a conduction band of the shell is higher than energy E$_{c\_core}$ at a lower end of a conduction band of the core and a condition that energy $E_{v\_shell}$ at an upper end of a valence band of the shell is lower than energy $E_{v\_core}$ at an upper end of a valence band of the core.

8. The color conversion particle according to claim 7, wherein a band gap of the shell is greater than a band gap of the core.

9. The color conversion particle according to claim 8, wherein the band alignment satisfies a condition that energy $E_{c\_shell}$ at a lower end of a conduction band of the shell is higher than energy $E_{c\_core}$ at a lower end of a conduction band of the core and energy $E_{v\_shell}$ at an upper end of a valence band of the shell is lower than energy $E_{v\_core}$ at an upper end of a valence band of the core.

10. The color conversion particle according to claim 1, wherein a band gap of the shell is 3.4 eV or less.

11. The color conversion particle according to claim 1, wherein a thickness of the shell is 2 nm or more and 300 nm or less.

12. The color conversion particle according to claim 11, wherein a thickness of the shell is 2 nm or more and 50 nm or less.

13. The color conversion particle according to claim 12, wherein a thickness of the shell is 2 nm or more and 30 nm or less.

14. The color conversion particle according to claim 12, wherein a thickness of the shell is 2 nm or more and 10 nm or less.

15. The color conversion particle according to claim 1, wherein the shell has a plurality of layers.

16. The color conversion particle according to claim 1, wherein the shell has a plurality of the cores.

17. The color conversion particle according to claim 1, wherein the core contains a light absorbing material.

18. The color conversion particle according to claim 1, wherein at least one of the shell or the core includes a foreign substance that does not both absorb and emit light.

19. The color conversion particle according to claim 1, wherein at least one of the shell and the core has a structure in which physical properties change in a gradient manner in a depth direction.

20. A powder comprising the color conversion particle according to claim 1.

21. A solution comprising the color conversion particle according to claim 1.

22. A thin film comprising the color conversion particle according to claim 1.

23. A sheet comprising the color conversion particle according to claim 1.

24. A device comprising the color conversion particle according to claim 1.

25. The color conversion particle according to claim 1, wherein the chalcogenide perovskite is represented by a formula selected from the group consisting of $ABX_3$, $A'_2A_{n-1}B_nX_{3n+1}$, $A''A'''B''_2X_7$, $A''A_2B''_3X_{10}$, and $A_2BB'X_6$, wherein X represents S, Se, and Te, A and A' represent Ca, Sr, and Ba, A" represents Li, Na, K, Rb, and Cs, and A''' represents rare earth elements and Bi, B and B' represent Ti, Zr, and Hf, B" represents V, Nb, and Ta, and n is a positive integer, wherein A and A' may be the same element, B and B' may be the same element, and A, A', A", A''', B, B', B", and X include mixtures of each element at any ratio.

26. The color conversion particle according to claim 1, wherein the core includes one or more voids.

27. The color conversion particle according to claim 1, wherein further comprising an outer shell outside the shell, and a void is formed between the shell and the outer shell.

* * * * *